United States Patent
Brown et al.

(10) Patent No.: US 10,872,007 B2
(45) Date of Patent: Dec. 22, 2020

(54) METHODS AND SYSTEMS TO COMPOUND ALERTS IN A DISTRIBUTED COMPUTING SYSTEM

(71) Applicant: VMware, Inc., Palo Alto, CA (US)

(72) Inventors: Darren Brown, Seattle, WA (US); Ron Oded Gery, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 15/971,644

(22) Filed: May 4, 2018

(65) Prior Publication Data

US 2019/0340057 A1    Nov. 7, 2019

(51) Int. Cl.
*G06F 11/00* (2006.01)
*G06F 11/07* (2006.01)

(52) U.S. Cl.
CPC ...... *G06F 11/0775* (2013.01); *G06F 11/0709* (2013.01); *G06F 11/079* (2013.01); *G06F 11/0751* (2013.01); *G06F 11/0769* (2013.01)

(58) Field of Classification Search
CPC ............ G06F 11/0775; G06F 11/0709; G06F 11/079; G06F 11/0769; G06F 11/0751; G06F 11/0724; G06F 11/0778; G06F 11/0772
USPC .......................................................... 714/37
See application file for complete search history.

(56) References Cited

U.S. PATENT DOCUMENTS

| | | | |
|---|---|---|---|
| 2006/0265285 A1* | 11/2006 | Hamasaki | G06Q 20/20 705/16 |
| 2010/0017009 A1* | 1/2010 | Baseman | G05B 19/0428 700/109 |
| 2013/0104140 A1* | 4/2013 | Meng | G06F 9/4881 718/104 |
| 2013/0198227 A1* | 8/2013 | Fradkin | G06F 16/245 707/769 |
| 2014/0250336 A1* | 9/2014 | Tepus | G06F 11/3636 714/38.1 |

* cited by examiner

*Primary Examiner* — Yair Leibovich

(57) ABSTRACT

Computational methods and systems described herein are directed to compounding alerts generated in a distributed computing system. A user or system administrator may define a set of multistage process rules that can be used by a log management server application to examine log messages generated by event sources of a multistage process for alerts. A log-message database is searched to identify a log-message file used to record log messages generated by the event sources. A single compound alert indicating that the multistage process rules are satisfied is generated, when log messages of the log-message file that satisfy the rules of the multistage process rules have been identified. Methods may also execute remedial action to correct the multistate process when log messages of the log-message file fail to satisfy at least one rule of the multistage process rules.

14 Claims, 30 Drawing Sheets log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]

FIG. 15

[2017-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]

FIG. 16

```
2017-12-02T10:44:24.095Z li-qe-esx5.vmware.com Rhttpproxy:
[28959B90 verbose 'Proxy Req 46691'] Connected to
localhost:8307
```

```
2017-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)
```

```
2017-12-02T10:44:24.093Z li-qe-esx5.vmware.com Rhttpproxy:
[2889B90 verbose 'Proxy Req 46685'] The client closed the
stream, not unexpectedly.
```

```
Dec  2 18:48:29 strata-vc 2017-12-02T18:48:30.273Z
[7FA39448B700 info 'commonvpxLro' opID=1947d6f9]  [VpxLRO] -
FINISH task-internal-2163522 -- -- vim.SessionManager.logout -
```

```
2017-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback
```

```
2017-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd
```

```
2017-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

```
2017-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 17

METHODS AND SYSTEMS TO COMPOUND ALERTS IN A DISTRIBUTED COMPUTING SYSTEM

TECHNICAL FIELD

This disclosure is directed to methods and systems that compound alerts of a multistage process executed in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In distributed computing systems, individual computers, subsystems, and components generally output large volumes of status and error information recorded in log messages. In large, distributed computing systems, terabytes of log messages may be generated by these components each day. The log messages are collected and stored as log-message files in data-storage appliances and may be investigated both in real time, as the log messages are generated and received, as well as retrospectively, after the log messages have been initially processed and stored in log-message files. Individual log messages typically provide a description of the status of a process or a component of the distributed computing system at a point in time, but a log message alone does not provide a full description of the progress of a process. For example, a log message may be generated indicating that a first process has started. An alert indicating that the first process has started based on the log message may create the false impression that the process is progressing without incident, because a subsequent log message indicating that the first process failed to finish or log messages indicating that dependent process should have started when the first process finished are not generated. In addition, system administrators are often inundated with superfluous information recorded in numerous log messages. For example, a single performance problem with a process running in a distributed computing system may create a series of log messages that describe various other performance problems that stem from the original performance problem. As a result, a system administrator has to manually sort through the log messages to identify the root of the problem, which is time consuming and error prone.

SUMMARY

Computational methods and systems described herein are directed to compounding alerts generated in a distributed computing system. A user or system administrator defines a set of multistage process rules that are used by a log management server application to examine log messages generated by event sources of a multistage process for alerts and defines a compound alert that represents the alerts. Methods search a log-message database to identify a log-message file used to record log messages generated by the event sources. Methods search the log-message file for log messages that satisfy rules of the set of multistage process rules. Methods generate the compound alert indicating that the multistage process rules are satisfied, when log messages of the log-message file that satisfy the rules of the multistage process rules have been identified. By generating a single compound alert, superfluous alerts associated with the log messages may be avoided.

DESCRIPTION OF THE DRAWINGS

FIG. 15 shows an example of a log write instruction.

FIG. 16 shows an example of a log message generated by a log write instruction.

FIG. 17 shows a small, eight-entry portion of a log-message file.

DETAILED DESCRIPTION

Figure 1:
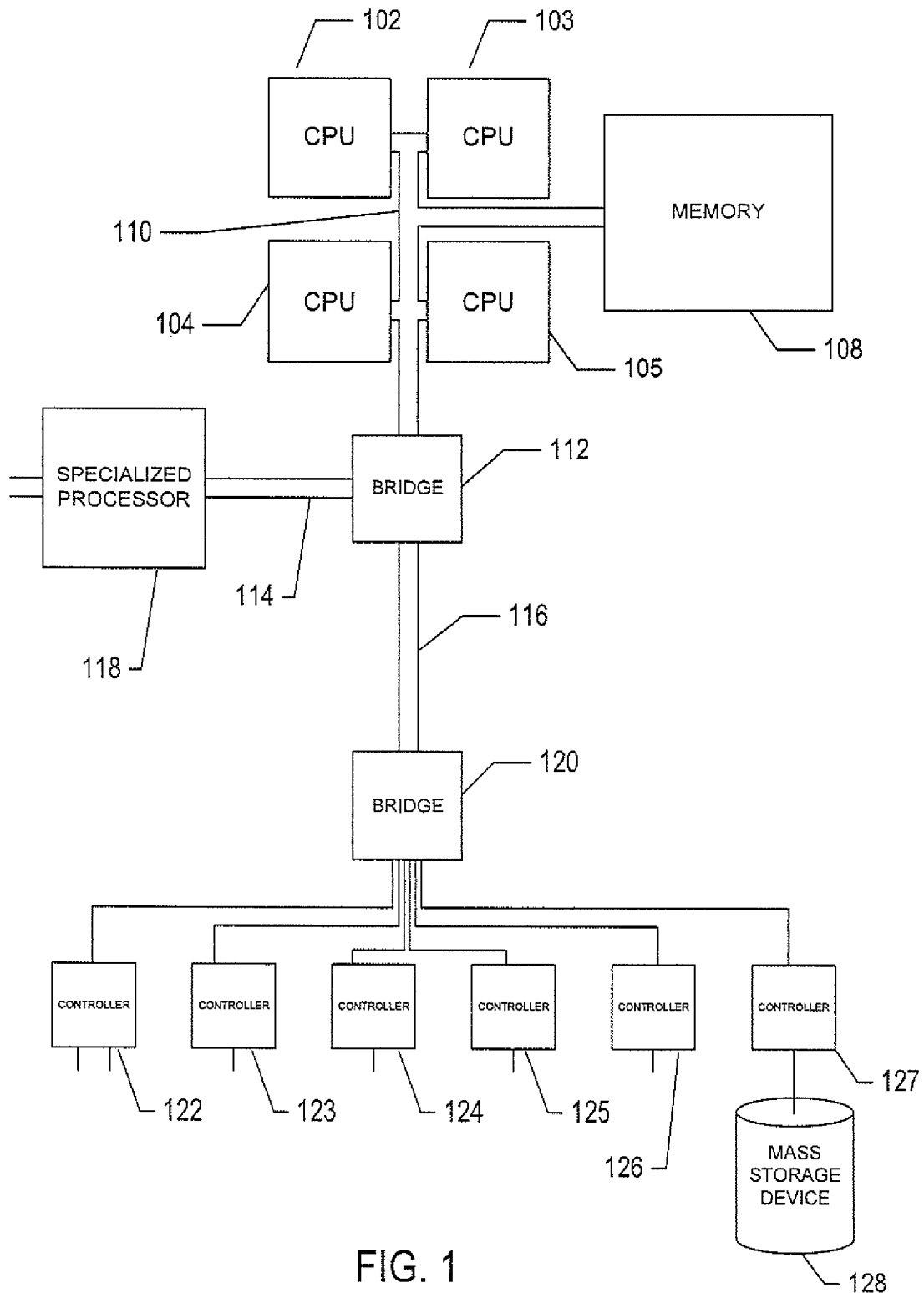
FIG. 1 shows an architectural diagram for various types of computers.

This disclosure presents computational methods and systems to compound alerts in a distributed computing system. In a first subsection, computer hardware, complex computational systems, and virtualization are described. Containers and containers supported by virtualization layers are described in a second subsection. Logging event messages in log-message files is described in a third subsection. Methods to compound alerts are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, containers, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
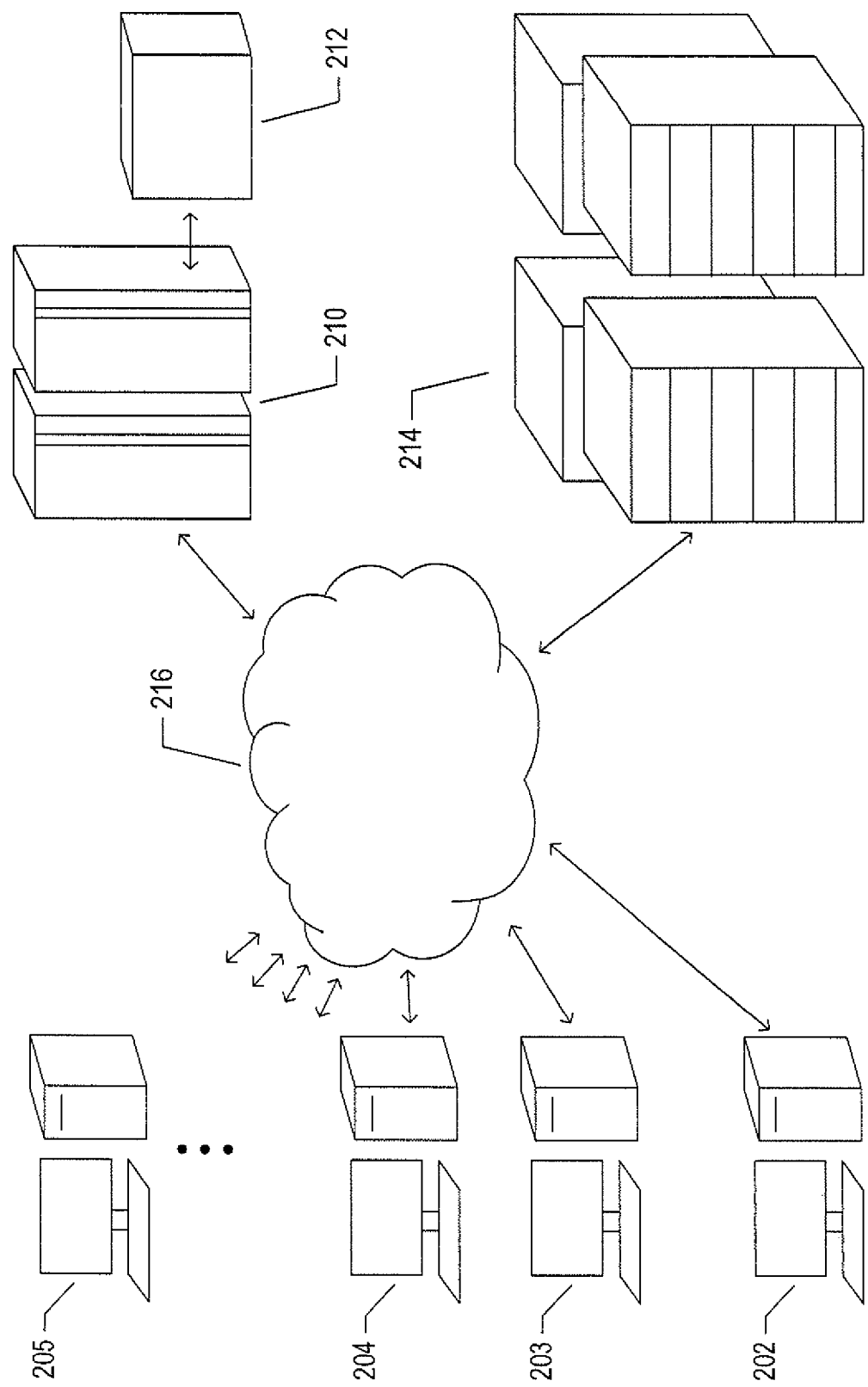
FIG. 2 shows an Internet-connected distributed computing system.

FIG. 2 shows an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
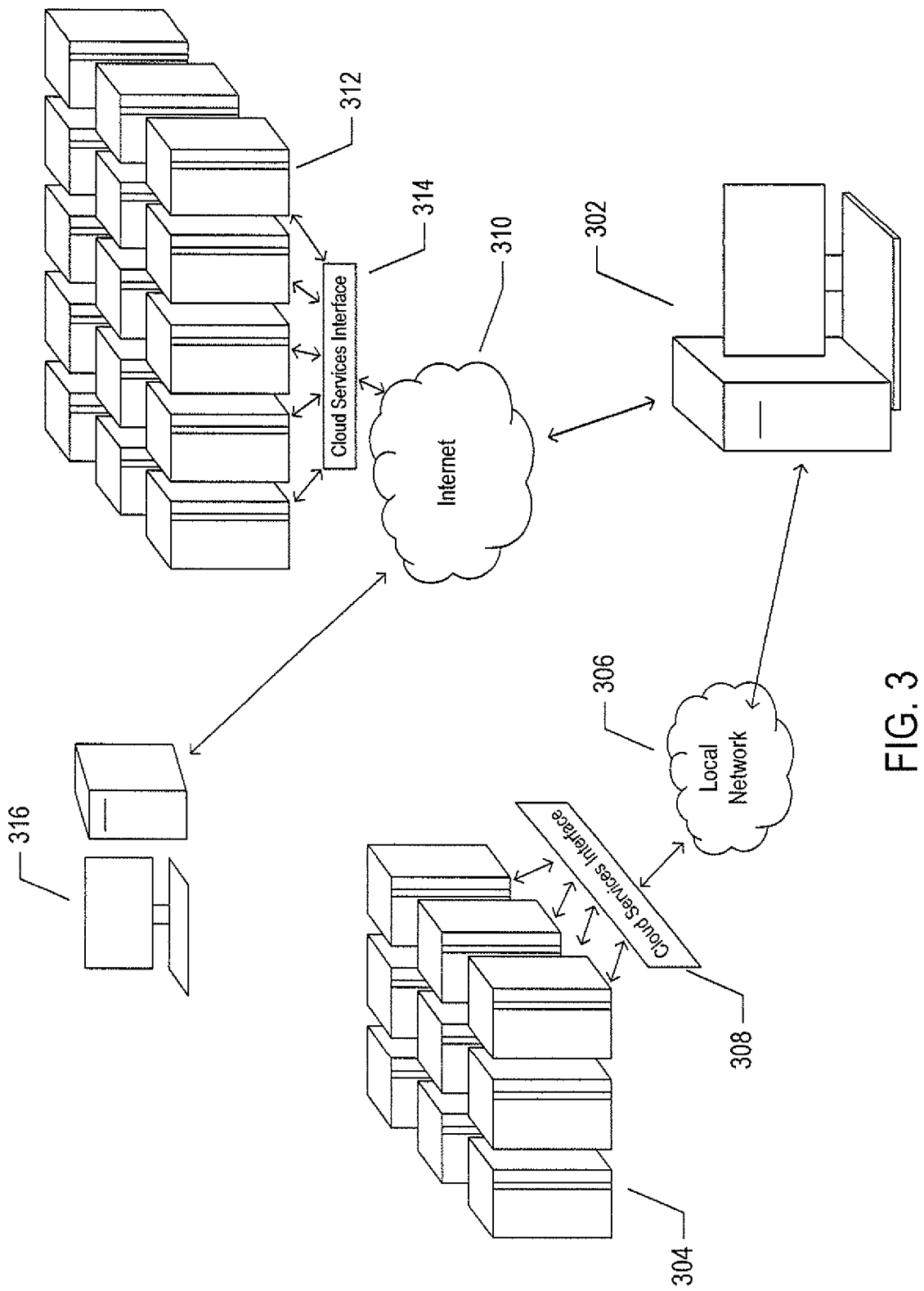
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
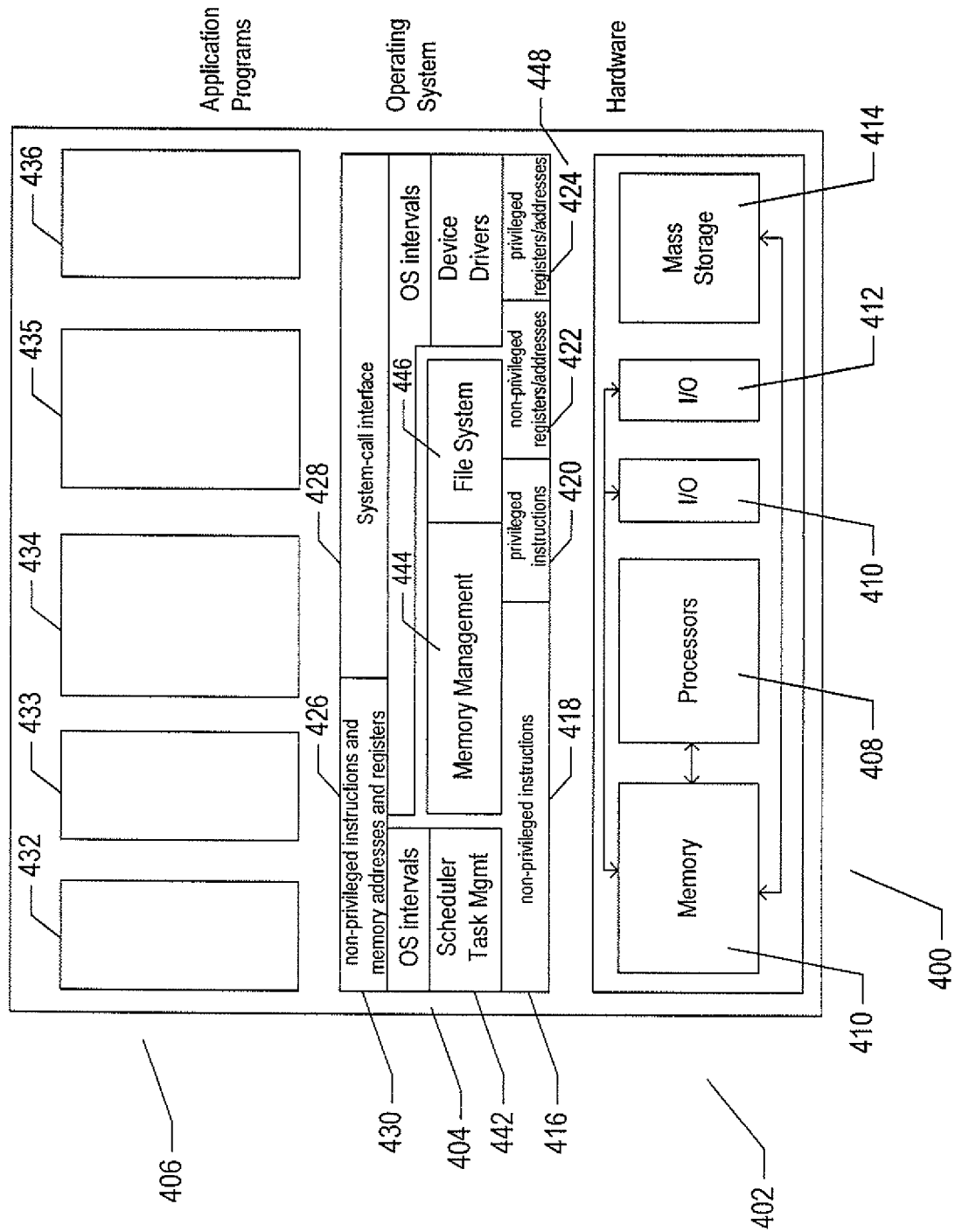
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
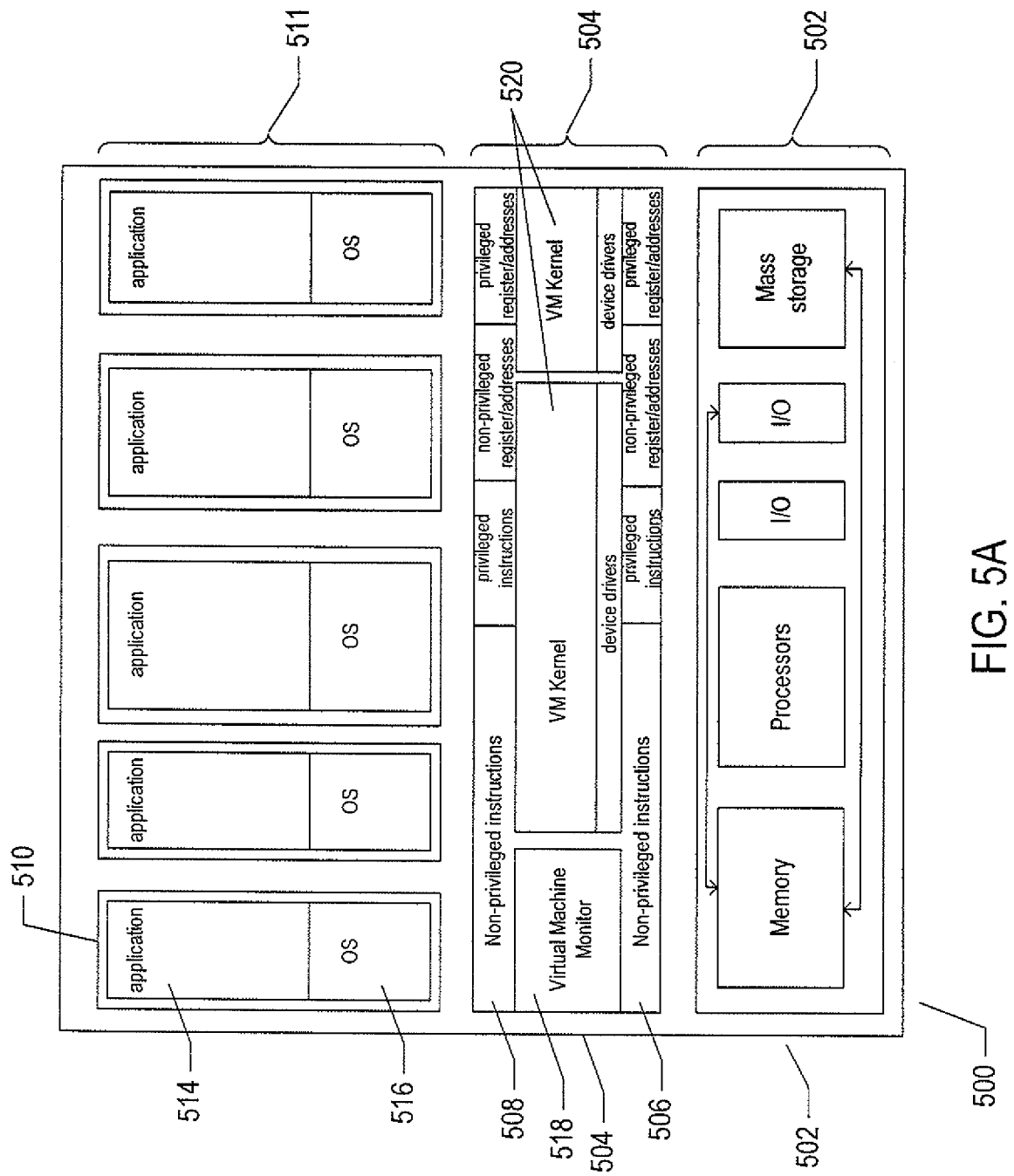
FIGS. 5A-5B show two types of virtual machine ("VM") and VM execution environments.
Figure 5B:
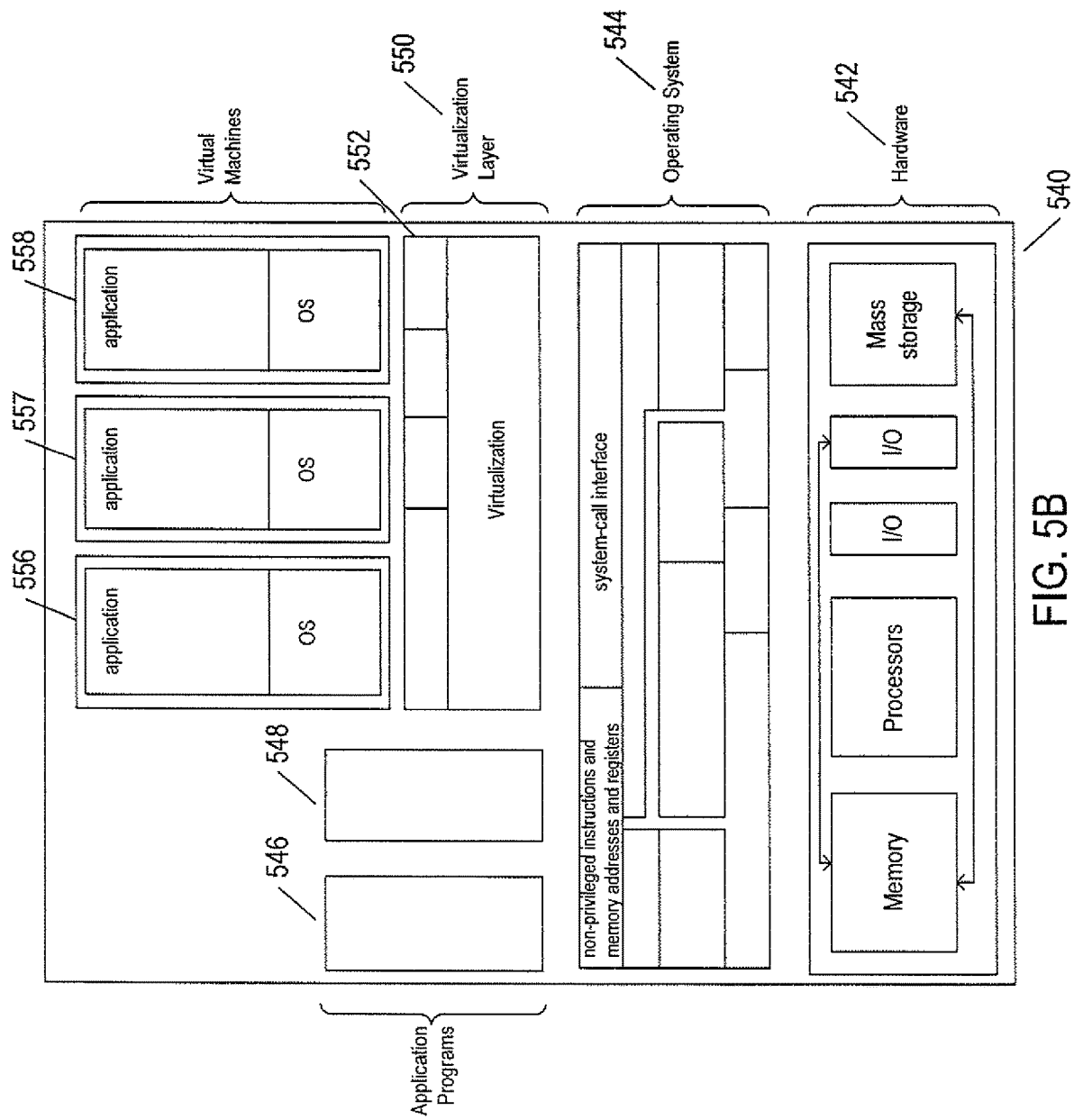

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
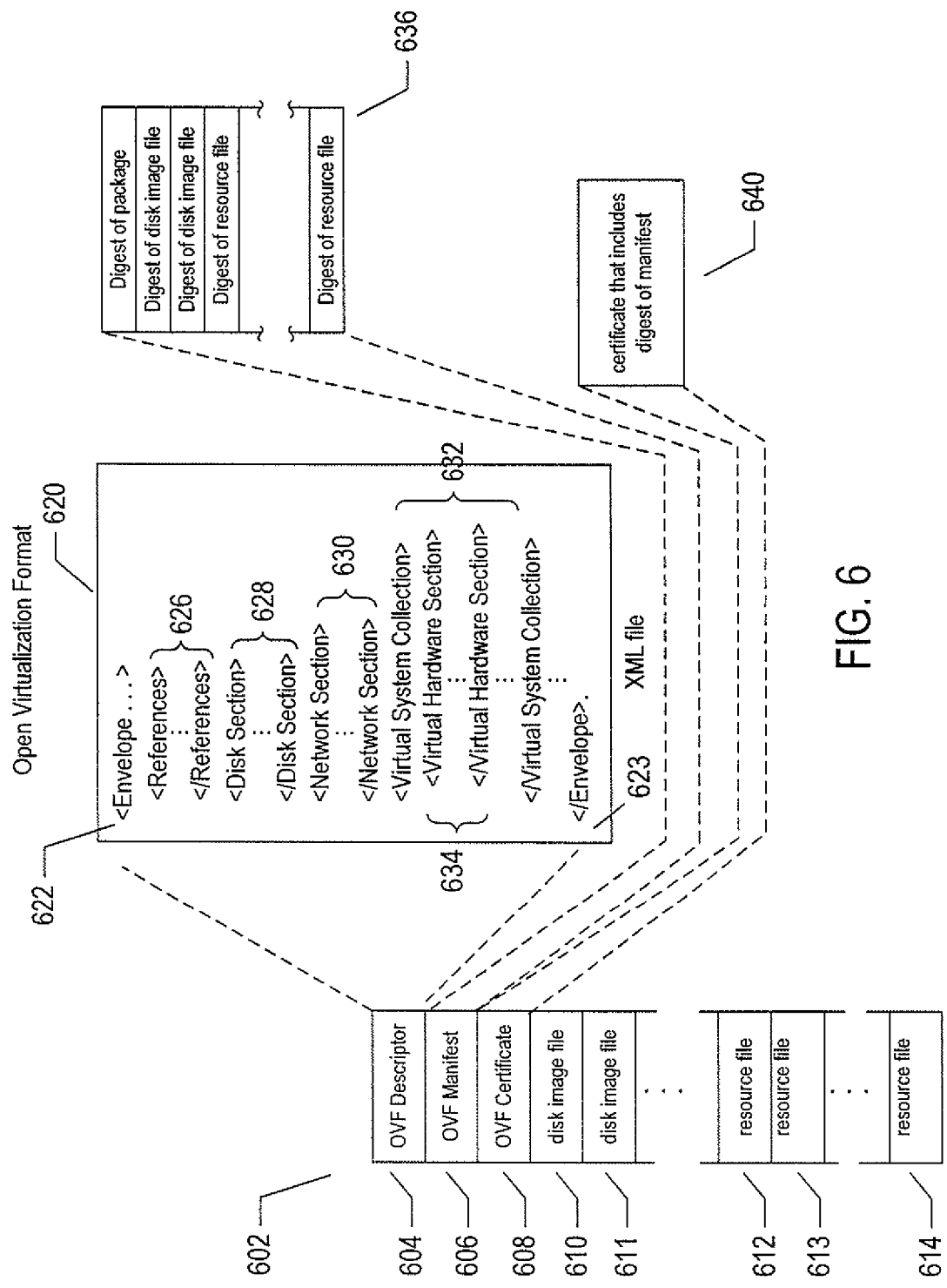
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
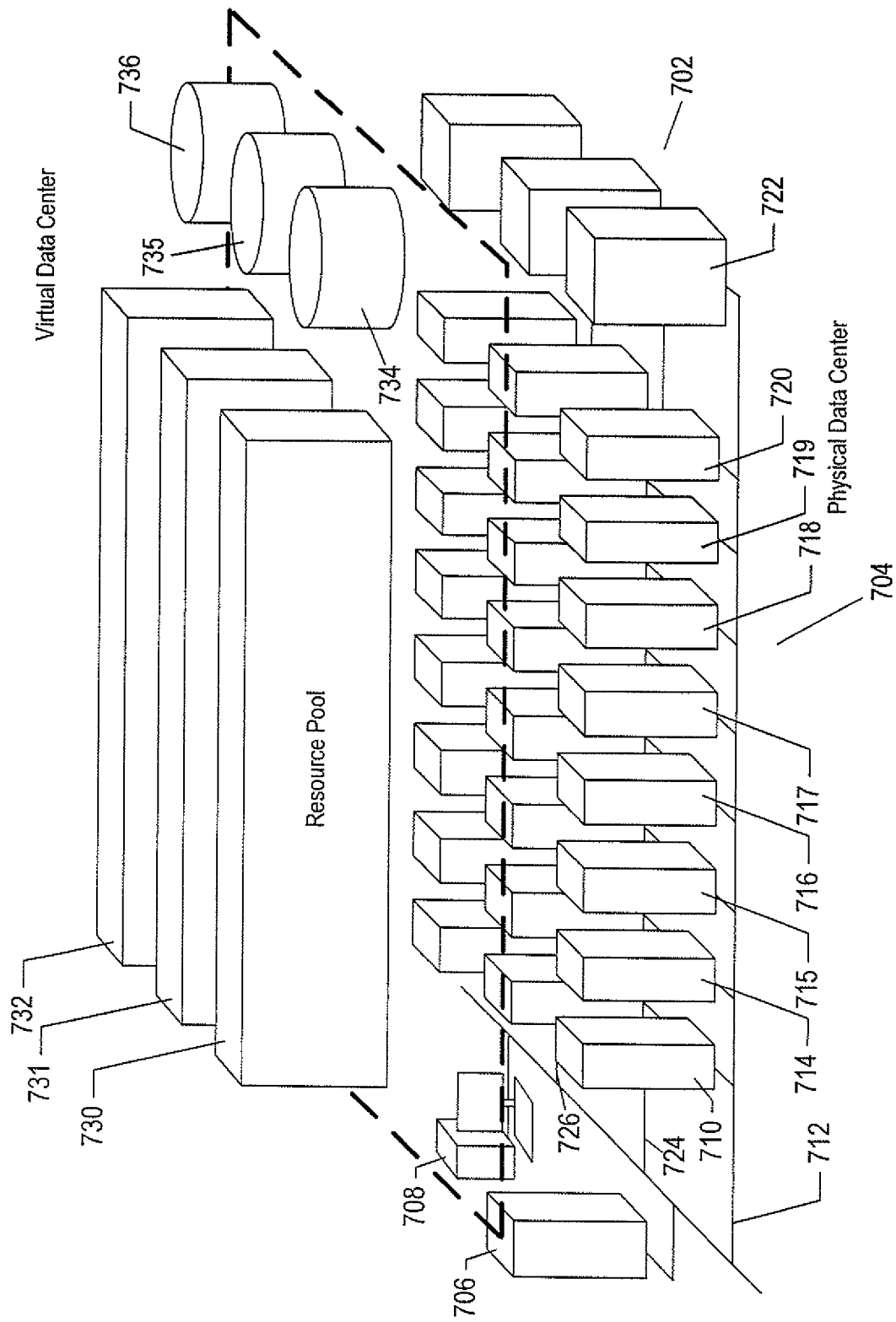
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
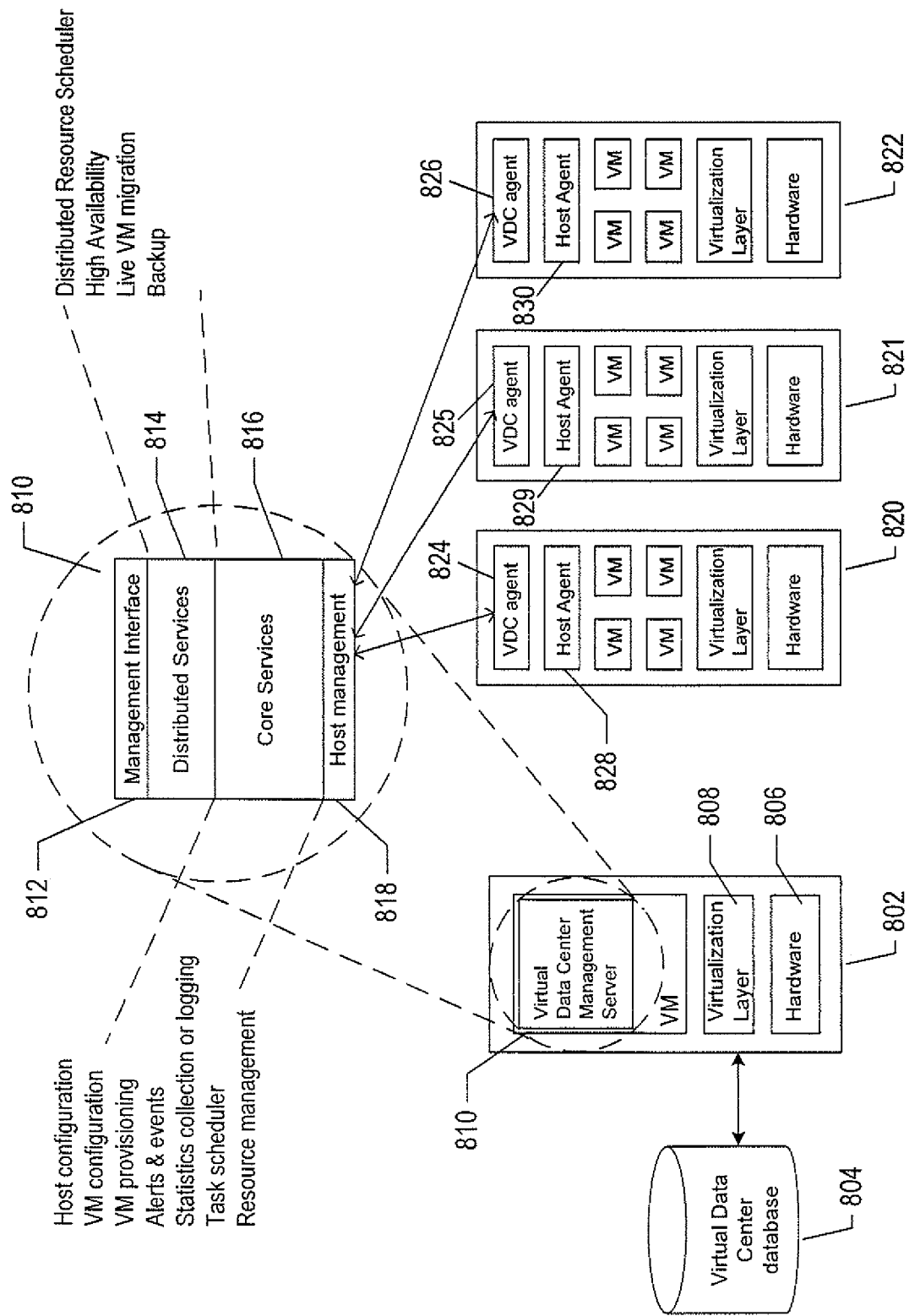
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
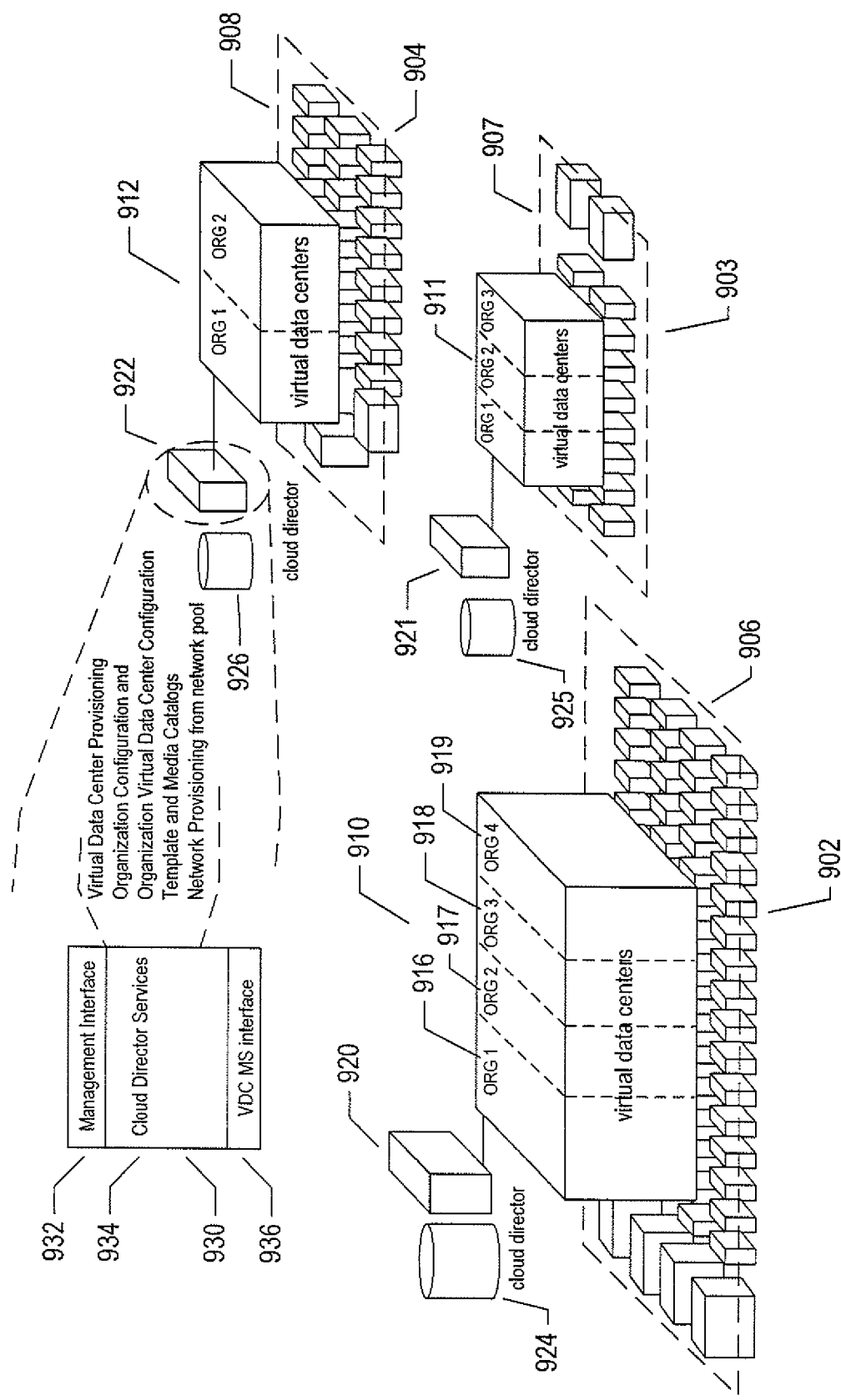
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
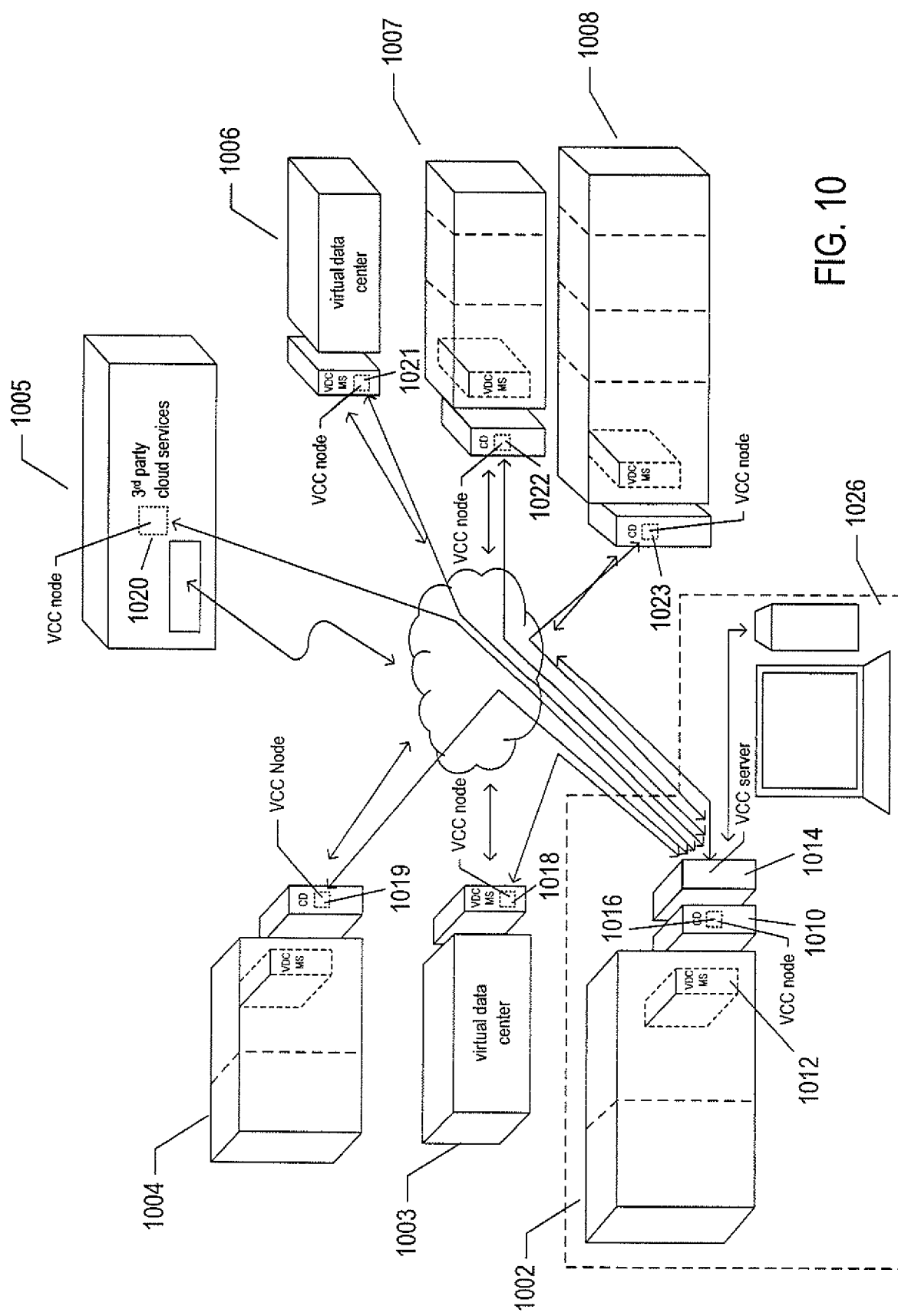
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by
Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
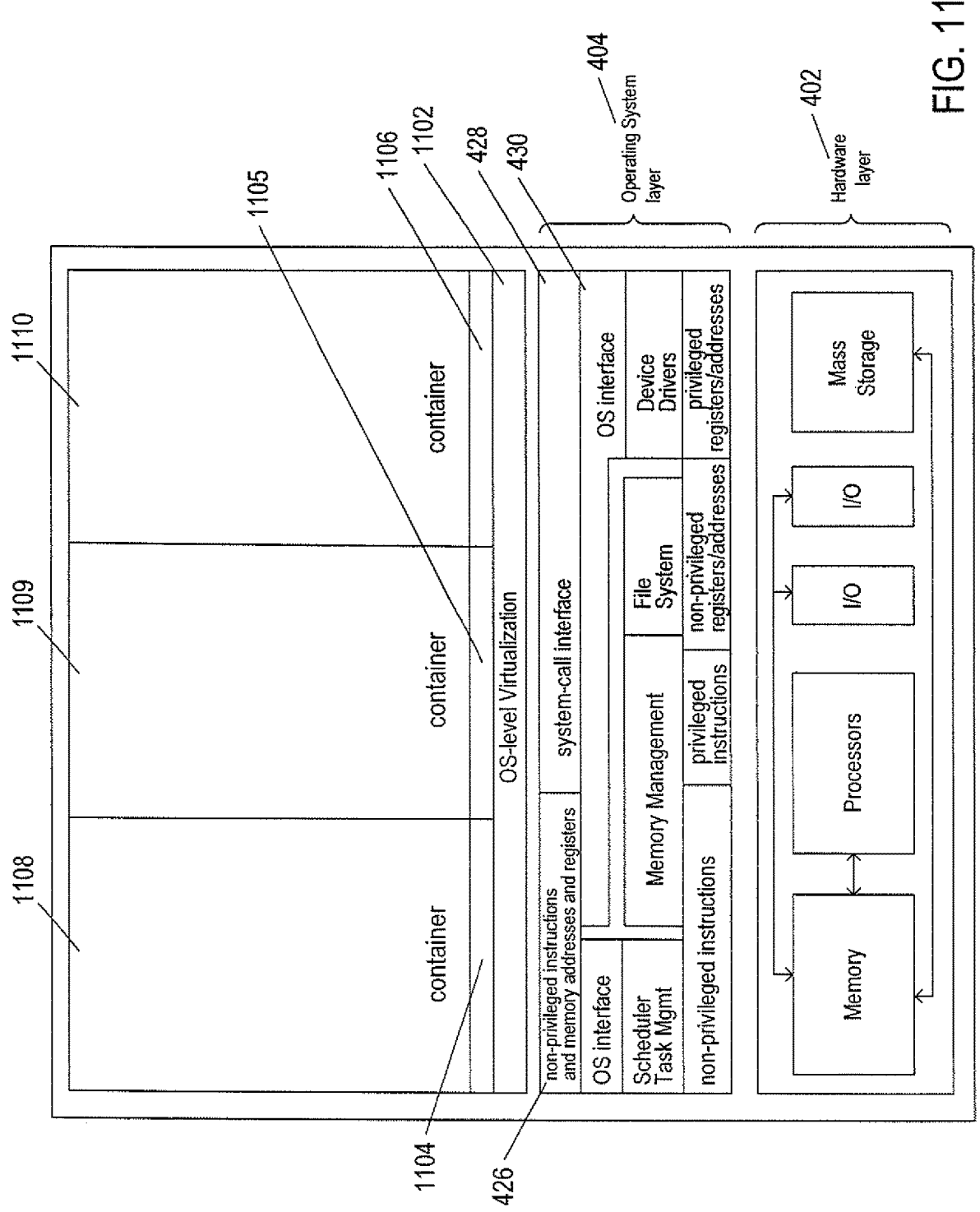
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
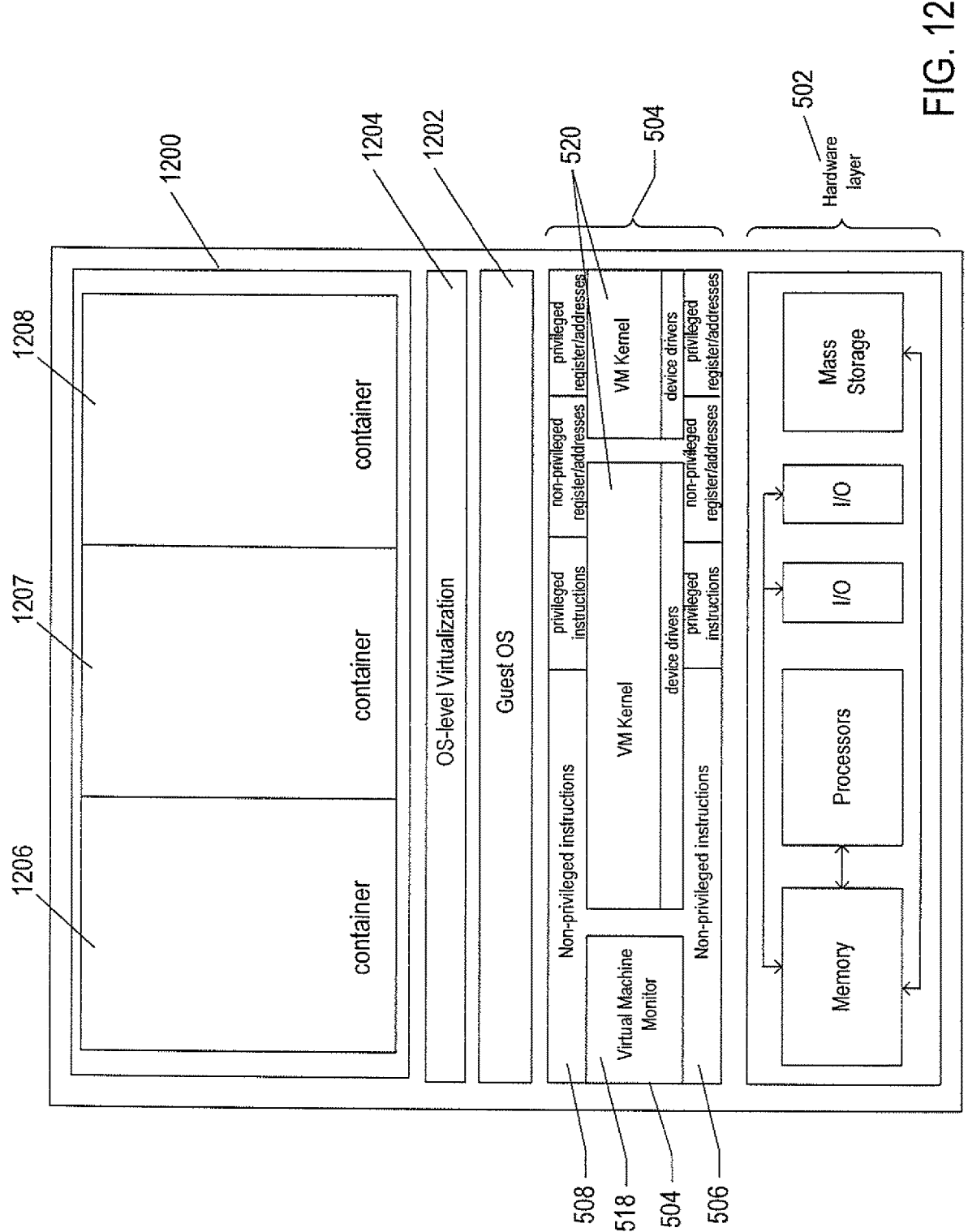
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Logging Log Messages and Log-Message Files

Figure 13:
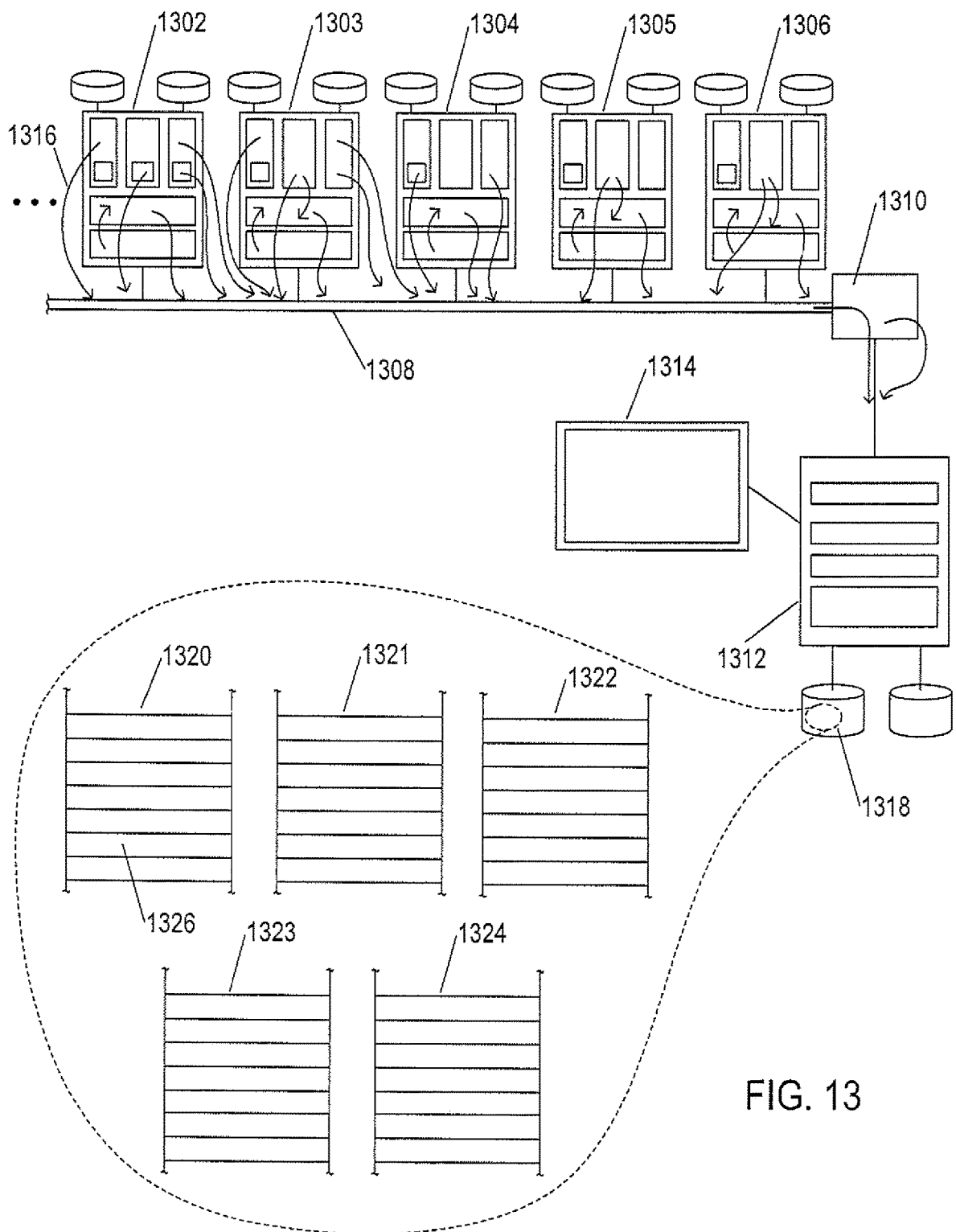
FIG. 13 shows an example of logging log messages in log-message files.

FIG. 13 shows an example of logging log messages in log-message files of log-message database. In FIG. 13, a number of computer systems 1302-1306 within a distributed computing system are linked together by an electronic communications medium 1308 and additionally linked through a communications bridge/router 1310 to an administration computer system 1312 that includes an administrative console 1314. One or more of the computer systems 1302-1306 may run a log monitoring agent that collects and forwards log messages to a log management server that runs on the administration computer 1312. As indicated by curved arrows, such as curved arrow 1316, multiple components within each of the discrete computer systems 1302-1306 as well as the communications bridge/router 1310 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of the distributed computing system. Log messages may be collected at various hierarchical levels within a discrete computer system and then forwarded to the log management server in the administration computer 1312. For example, a log monitoring agent running on one or more of the computer systems 1302-1306 collects and forwards the log messages at various hierarchical levels. The log management server in the administration computer 1312 collects and stores the received log messages in a data-storage device or appliance 1318 as log-message files 1320-1324 that form a log-message database. Rectangles, such as rectangle 1326, represent individual log messages. For example, log-message file 1320 may comprise a list of log messages generated within the computer system 1302. Each log monitoring agent has an agent monitoring configuration that includes a log path and a log parser. The log path specifies a unique file system path in terms of a directory tree hierarchy that identifies the storage location of a log-message file associated with the event source on the administration computer 1312 or the data-storage device or appliance 1318 in the log-message database. The log monitoring agent receives specific file and event channel log paths to monitor log-message files and the log parser includes log parsing rules to extract and format lines of log message into log message fields. The log monitoring agent then sends the constructed structured log messages to the log management server. The administrative computer 1312 and computer systems 1302-1306 can function without log management agents and a log management server, but with less precision and certainty.

Figure 14:
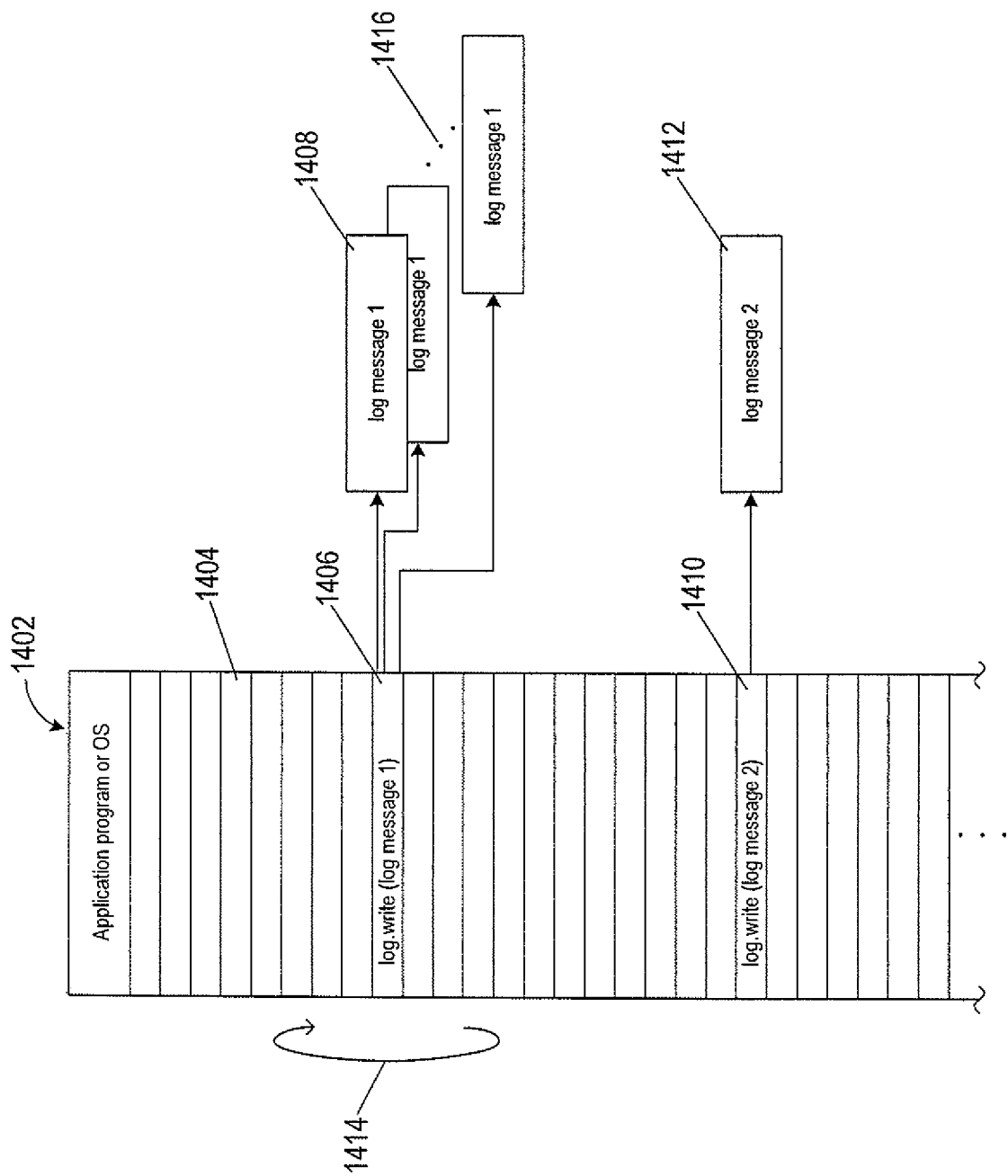
FIG. 14 shows an example of a source code with log write instructions.

FIG. 14 shows an example of a source code 1402 of an application program, an operating system, a virtual machine, a container, a guest operating system, or any other computer program or machine code. The source code 1402 is just one example of an event source that generates log messages. Rectangles, such as rectangle 1404, represent a definition, a comment, a statement, or a computer instruction that expresses some action to be executed by a computer. The source code 1402 includes log write instructions that generate log messages when certain events predetermined by the developer occur during execution of the source code 1402. For example, source code 1402 includes an example log write instruction 1406 that when executed generates an "log message 1" represented by rectangle 1408, and a second example log write instruction 1410 that when executed generates "log message 2" represented by rectangle 1412. In the example of FIG. 14, the log write instruction 1406 is embedded within a set of computer instructions that are repeatedly executed in a loop 1414. As shown in FIG. 14, the same log message 1 is repeatedly generated 1416. The same type of log write instructions may also be located in different places throughout the source code, which in turns creates repeats of essentially the same type of log message in the log-message file.

In FIG. 14, the notation "log.write( )" is a general representation of a log write instruction. In practice, the form of the log write instruction varies for different programming languages. In general, log messages are relatively cryptic, including generally only one or two natural-language words and/or phrases as well as various types of text strings that represent file names, path names, and, perhaps various alphanumeric parameters. In practice, a log write instruction may also include the name of the source of the log message (e.g., name of the application program or operating system and version) and the name of the log-message file to which the log message is to be written. Log write instructions may be written in a source code by the developer of an application program or operating system in order to record events that occur while an operating system or application program is running. For example, a developer may include log write instructions that are executed when certain events occur, such as failures, logins, or errors.

FIG. 15 shows an example of a log write instruction 1502. The log write instruction 1502 includes arguments identified with "$." For example, the log write instruction 1502 includes a time-stamp argument 1504, a thread number argument 1505, and an internet protocol ("IP") address argument 1506. The example log write instruction 1502 also includes text strings and natural-language words and phrases that identify the type of event that triggered the log write instruction, such as the word "repair" 1508. The text strings between brackets "[ ]" represent file-system paths, such as path 1510. When the log write instruction 1502 is executed, parameters are assigned to the arguments and the text strings and natural-language words and phrases are stored as a log message in a log-message file.

FIG. 16 shows an example of a log message 1602 generated by the log write instruction 1502. The arguments of the log write instruction 1502 are assigned numerical parameters that are recorded in the log message 1602 at the time the log message is generated or written to the log-message file. For example, the time stamp 1504, thread 1505, and IP address 1506 of the log write instruction 1502 are assigned corresponding numerical parameters 1604-1606 in the log message 1602. The time stamp 1604, in particular, represents the date and time the log message is generated. The text strings and natural-language words and phrases of the log write instruction 1502 also appear unchanged in the log message 1602 and may be used to identify the type of event that occurred during execution of the application program or operating system.

FIG. 17 shows a small, eight-entry portion of a log-message file 1702. In FIG. 17, each rectangular cell, such as rectangular cell 1704, of the portion of the log-message file 1702 represents a single stored log message. For example, log message 1702 includes a short natural-language phrase 1706, date 1708 and time 1710 numerical parameters, as well as, an alphanumeric parameter 1712 that identifies a particular host computer.

Figure 18:
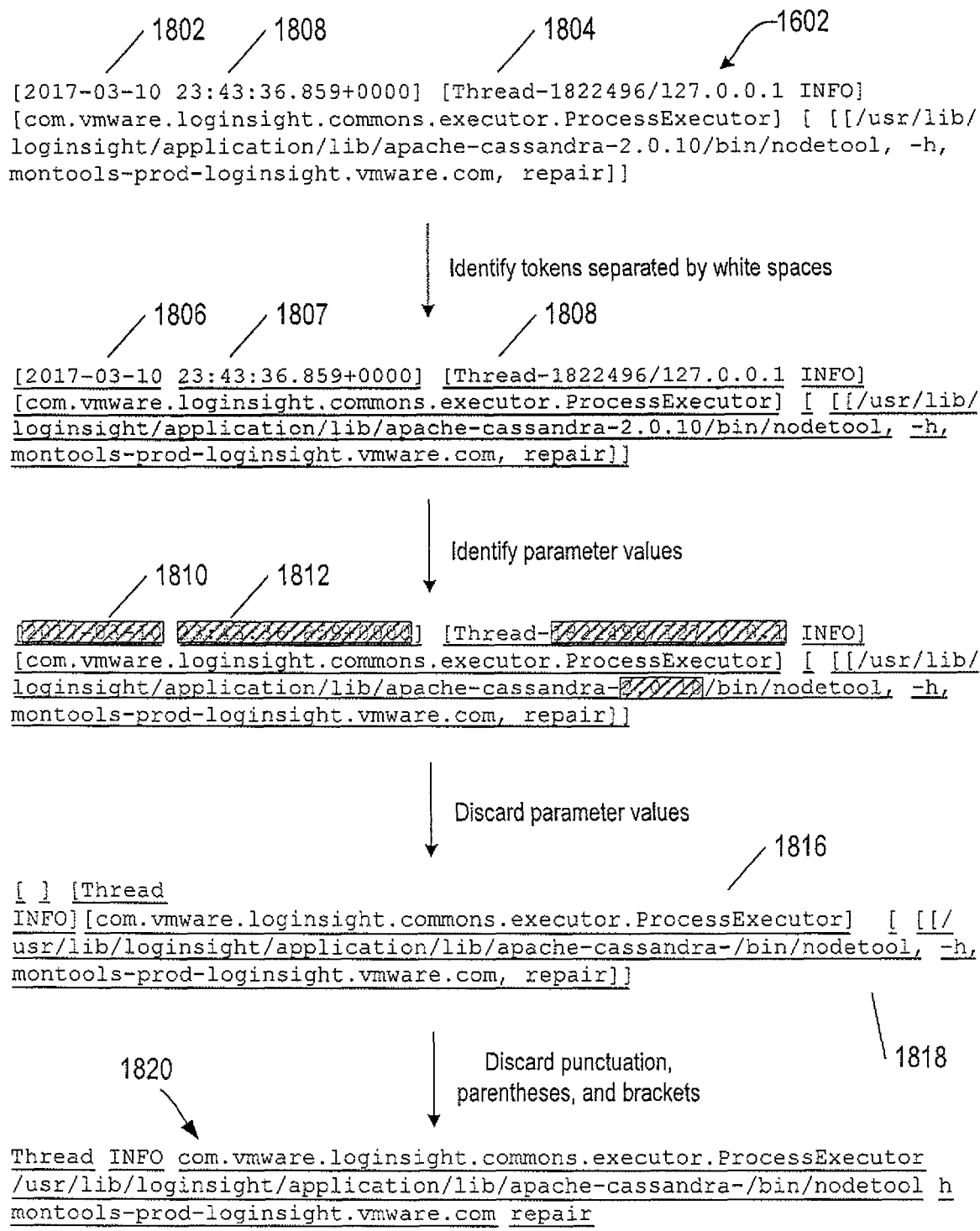
FIG. 18 shows an example of event-type analysis performed on the log message shown in FIG. 16.

FIG. 18 shows an example of event-type analysis performed on the log message 1602 shown in FIG. 16. The log message 1602 is first tokenized by considering the log message as comprising tokens separated by non-printed characters, referred to as "white space." In FIG. 18, this initial tokenization of the log message 1602 is illustrated by underlining of the printed or visible characters. For example, the date 1802, time 1803, and thread 1804 at the beginning of the text contents of the log message 1602, following initial tokenization, become a first token 1806, a second token 1807, and a third token 1808, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each log message, with two log messages having an identical date/time stamp only in the case that the two log messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the word "repair" in log message 1602 likely occurs within each of many repair session log messages. In FIG. 18, the parametric-valued tokens in the log message following initial token recognition are indicated by shading. For example, initial token recognition determines that the first token 1806 is a date and the second token 1807 is a time. The tokens identified as parameters are identified by shaded rectangles, such as shaded rectangle 1810 of the date 1806 and shaded rectangle of 1812 of the time 1807. The parametric-valued tokens are discarded leaving the non-parametric tokens, which are text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of log messages and, in the rare circumstances in which log messages may be mistyped, the mistyping is most often discovered during subsequent processing. In the implementation shown in FIG. 18, the log message 1602 is subject to textualization in which an additional token-recognition step of the non-parametric portions of the log message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized log message 1814 in FIG. 18. For example, brackets and a coma 1818 are underlined. The punctuation, parentheses, and brackets are discarded leaving a textualized log message of interest 1820 that comprises only the non-parametric tokens, including text strings and natural language words and phrases of the original log message 1602. The textualized log message 1820 represents an event type. Other textualized log messages with the same non-parametric text strings and natural language words and phrase as the textualized log messages 1820 are the same event type. Another textualized log message with one or more different non-parametric text strings or natural language words and phrase from those of the textualized log messages 1820 is of a different event type.

Methods and Systems to Compound Alerts in Distributed Computing Systems

A multistage process can be any sequence of processing steps carried out by applications, VMs, containers, computer systems, or any component of a distributed computing system. When certain stages of a multistage process have been reached or completed, a sequence of corresponding log messages may be generated and recorded in a log file. However, certain log messages when examined by a log management server may automatically trigger a corresponding sequence of alerts that indicate when a sequence of stages have completed or a sequence of performance problems have occurred, which can become overwhelming for a system administrator to keep track of.

Methods and systems enable a user or system administrator to define multistage process rules that can be used by a log management server application to examine log messages generated by event sources of a multistage process for alerts. The user or system administrator may also define a compound alert that corresponds to the multistage process rules and is generated instead of the alerts, thereby significantly reducing the number of alerts sent to the system administrator. In other words, instead of generating a sequence of alerts associated with the multistage process, a single compound alert that is representative of the sequence of alerts associated with the process is generated. Consider, for example, three alerts denoted by $A_1$, $A_2$, and $A_3$. Each of the alerts is triggered separately when the associated log messages are identified by the log management server. Suppose that a systems administrator has recognized that when the alert $A_1$ is triggered, the alerts $A_2$ and $A_3$ are subsequently triggered. In other words, correcting the problem identified by the alert $A_1$ corrects the problems identified by the alerts $A_2$ and $A_3$. The system administrator may also recognize that when the alert $A_2$ is triggered alone or the alert $A_3$ is triggered alone, the alert $A_1$ is not subsequently triggered. Methods and systems enable a system administrator to define a multistage process rule: if the alert $A_1$ is triggered, the alerts $A_2$ and $A_3$ are suppressed if either or both of the alerts $A_2$ and $A_3$ are triggered within a time interval that begins when the alert $A_1$ is triggered. In this case, the alert $A_1$ may serve as the compound alert. Alternatively, another compound alert may be defined to represent this sequence of alerts. Otherwise, when the time interval expires, the rule is not in effect and the alerts $A_2$ are $A_3$ are not suppressed when the associated log messages are generated. Other multistage process rules may be defined to identify when a multistage process of an application program, VM, container, computer system, or any component of a distributed computing system has failed. Methods and systems enable a system administrator to define a multistage process rule: if the alert $A_1$ is triggered and either of the alerts $A_2$ and $A_3$ is not subsequently triggered within a time interval that begins when the alert $A_1$ is triggered, a compound alert is triggered indicating the multistage process failed. Two examples of multistage processes and compound rules are described as follows:

1.) A first example of a multistage process is a server computer shutdown followed by an automatic startup of the server computer. A multistage process rule may be defined by a user as having two stages: A first rule defines log message terms that can be used to detect a first log message that describes the shutdown as having occurred within a first time interval. A second rule defines log message terms that can be used to detect a second log message that describes a startup of the same computer system within a second time interval. When both stages of the multistage process rule are satisfied, a compound alert may be generated indicating completion of the shutdown/startup process. On the other hand, if the first rule is satisfied but the second rule is not satisfied within a defined period of time, a compound alert may be generated indicating that the server computer failed to automatically startup after the shutdown.

2.) A second example of a multistage process relates to two VMs that run in a computer system, but only one of the VMs is permitted to run at a time. When one of the VMs is shutdown, a lock on the second VM is released and the second VM runs. A first rule defines terms that can be used to detect a first log message that describes a shutdown of the first VM as having occurred within a first time interval. A second rule defines terms that can be used to detect a subsequent second log message that describes a release of the lock on the second VM within a second time interval. A third rule defines terms that can be used to detect a subsequent third log message that describes the second VM as starting up. When all three rules of the multistage process rule are satisfied, a compound alert may be generated indicating completion of the shutdown of the first VM followed by an unlocking of the second VM and a startup of the second VM. On the other hand, if the first rule is satisfied but the second rule or the third rule is not satisfied, a compound alert may be generated indicating that the lock was not removed for the second VM.

Methods described below generate a compound alert associated with completion of a multistage process. Methods also eliminate false positive alerts by generating a compound alert when a process failed to finish.

Figure 19:
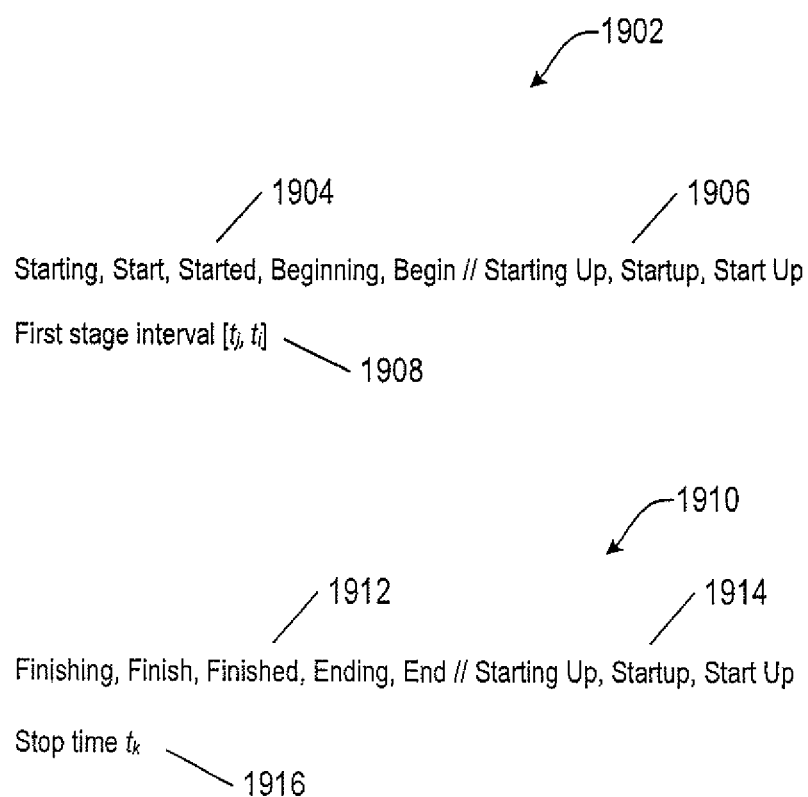
FIG. 19 shows an example of a two-stage process rule for starting and finishing a startup process.

FIG. 19 shows an example of a two-stage process rule input to a log management server application for starting and finishing a startup process of an event source. In FIG. 19, a first rule 1902 comprises two lists of terms 1904 and 1906 and a first stage interval denoted by $[t_i, t_j]$ 1908, where $t_i$ is a begin time and $t_j$ is an end time for the first stage interval. A log message with a combination of terms from the lists 1902 and 1904 and has a time stamp in the first stage interval 1908 satisfies the first rule of the two-stage process rule. For example, a log message with the terms "Begin" and "Startup" and has a time stamp of 12:21:02 PM in a first stage interval, such as [12:00:00 PM, 12:30:00 PM], satisfies the first rule of the two-stage process rule. In FIG. 19, a second rule 1910 comprises two lists of terms 1912 and 1914 and a stop search time 1916 denoted by $t_k$, where the stop time $t_k$ occurs later than the end time $t_j$. A log message with a combination of terms from the lists 1912 and 1914, such as the terms "Finished" and "Startup," and has a time stamp that occurs earlier than the stop search time $t_k$ satisfies the second rule of the two-stage process rule.

Figure 20:
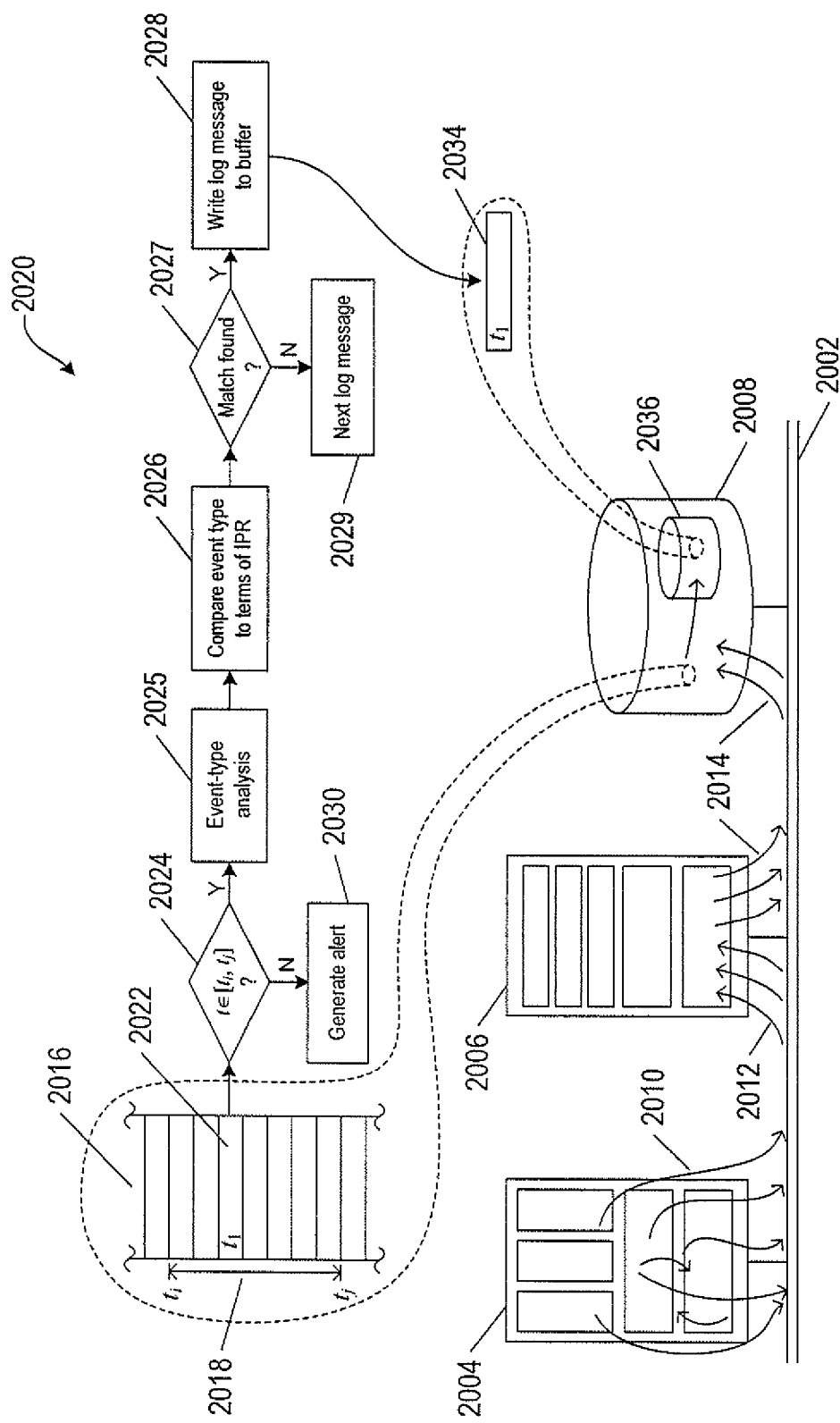
FIG. 20 shows an example of a search for a log message in a first stage interval that satisfies a first rule of a two-stage process rule.

FIG. 20 shows an example of a search for a log message in a first stage interval that satisfies a first rule of the two-stage process rule. In FIG. 20, an electronic communications medium 2002 links together a computer system 2004 of a distributed computing system, an administration computer system 2006, and a data-storage appliance 2008. The computer system 2004 may run a log management agent that collects log messages generated by various event sources running on the computer system 2004 and forwards the log messages to a log management server running on the administration computer system 2006 via the communications medium 2002 as indicated by directional arrows, such as directional arrow 2010. The log management server in the administration computer 2006 receives the log message 2012 and stores 2014 the log messages in a log-message file of log-message database maintained in the data-storage appliance 2008, as described above with reference to FIG. 13.

Figure 21:
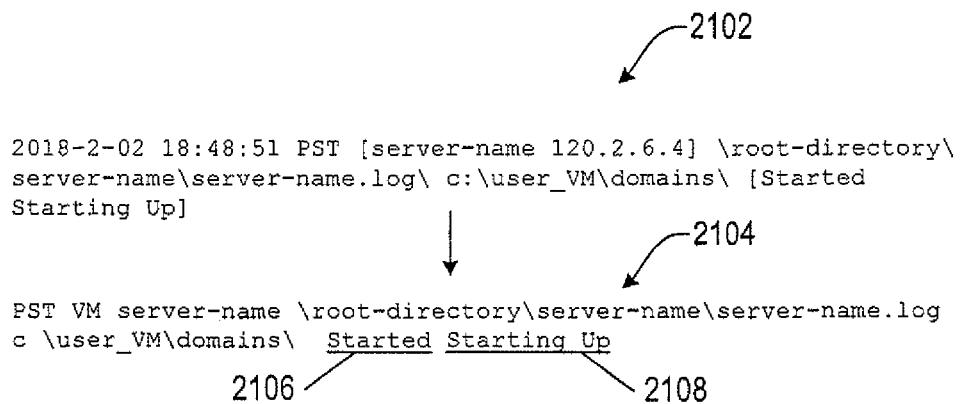
FIG. 21 shows an example of a log message with event-type analysis applied to obtain an event type.

In the example of FIG. 20, the log management server searches a log-message file 2016, stored in the data-storage device 2008 and corresponds to a process running in the computer system 2004, for a log message that satisfies a first rule. Directional arrow 2018 represents a first stage interval with a begin time $t_i$ and an end time $t_j$. The log management server applies a series of computational operations 2020 to each log message with a time stamp in the first stage interval 2018. In decision block 2024, log message 2022 has a time stamp $t_1$ in the first stage interval 2018 and control flows to block 2025. In block 2025, event-type analysis is applied to the log message 2022 to determine the event type as described above with reference to FIG. 18. FIG. 21 shows an example of log message 2022 with event-type analysis applied to obtain an event type 2104. Returning to FIG. 20, in block 2026, terms of the event type are compared with terms of the first rule. For example, in FIG. 19, the first rule 1902 defines a starting up process within a first stage interval. In FIG. 21, underlined terms 2106 and 2108 of the event type 2104 match terms in the lists 1902 and 1904 of the first rule 1902. As a result, a match between the event type 2104 and terms of the first rule 1902 is found. Returning to FIG. 20, in decision block 2027, control flows to block 2028 in which a copy 2034 of the log message 2022 is written to a buffer 2036 in the data-storage device 2008.

Otherwise, control flows to block 2029 and the operations represented by blocks 2024-2029 are repeated for a next log message in the log-message file 2016. In decision block 2024, when the end of the first stage interval 2018 is reached, time stamps of the log messages are no longer in the first stage interval 2018 and control flows to block 2030. In block 2030, an alert is generated indicating that the first rule is not satisfied.

When a log message that satisfies the first rule of a two-stage process rule is found, a second stage interval of the second rule is created. In one implementation, the second stage interval may range from the begin time $t_i$ of the first stage interval and end with the stop time $t_k$. In another implementation, the second stage interval begins with the time stamp $t_1$ of the log message that satisfies the first rule and ends at the stop time $t_k$.

Figure 23:
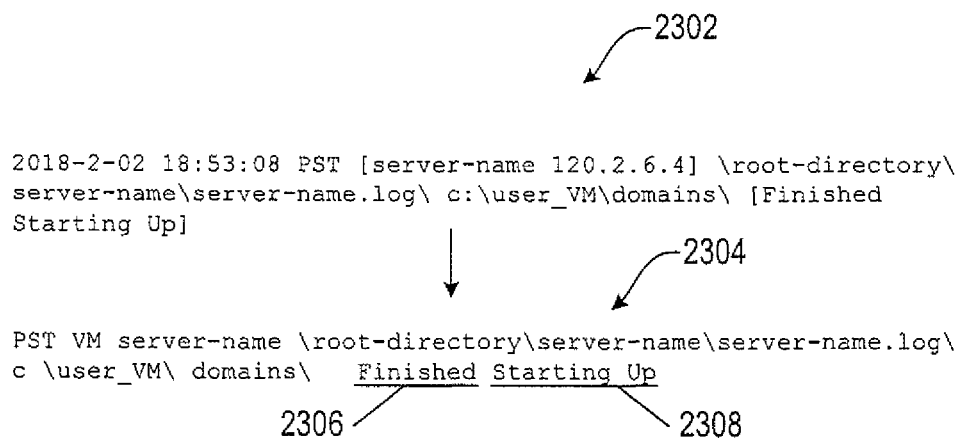
FIG. 23 shows an example a log message with event-type analysis applied to obtain an event type.
Figure 22:
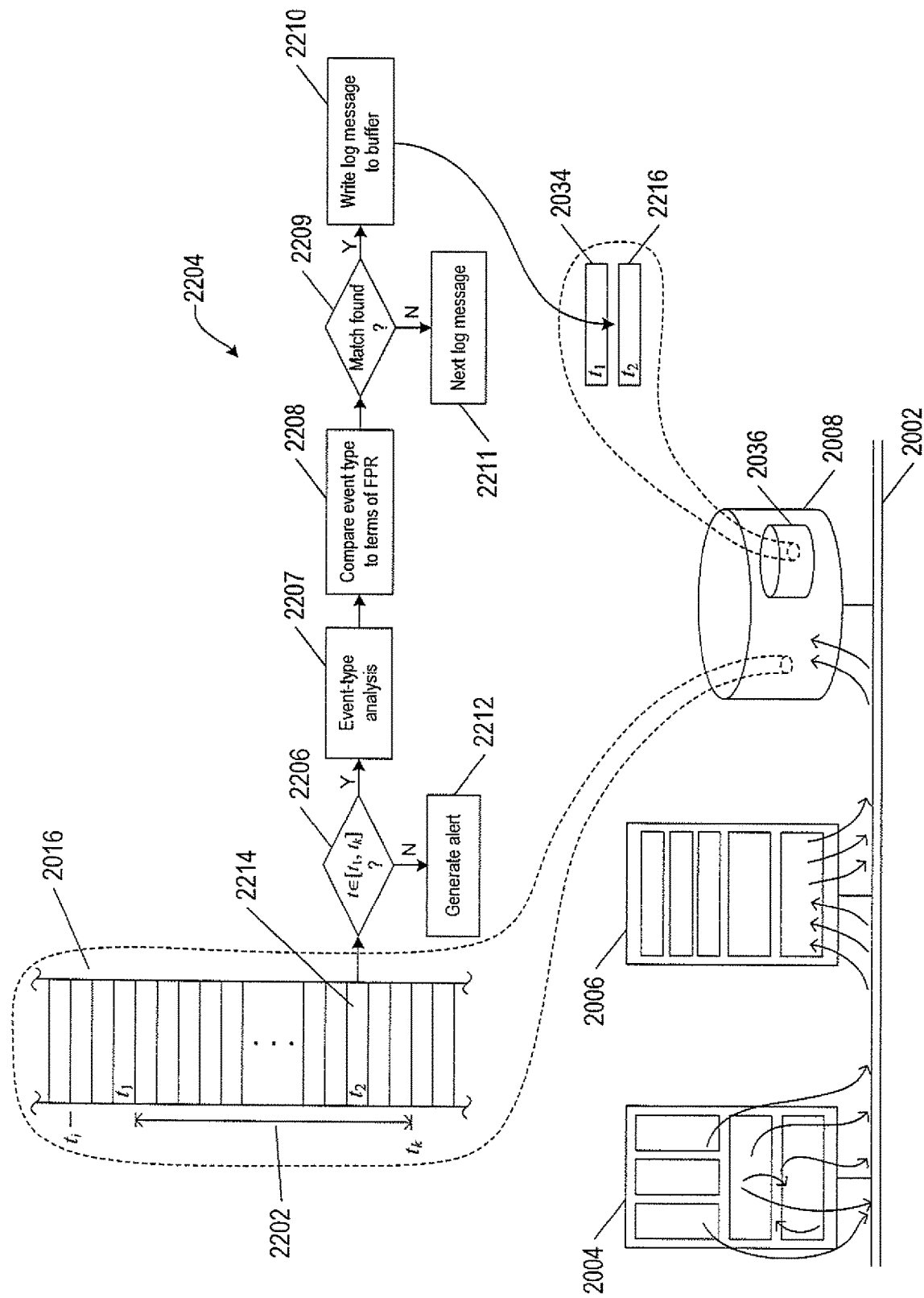
FIG. 22 shows an example of a search for a log message in a second stage interval that satisfies a second rule of a two-stage process rule.

In the example of FIG. 22, the log management server extends the search of the log-message file 2016 for a log message that satisfies the second rule of the two-stage process rule. Directional arrow 2202 represents a second stage interval that begins with the time stamp $t_1$ of the log message identified as satisfying the first rule and ends at the stop time $t_k$. The log management server applies a series of computational operations 2204 to each log message with a time stamp in the second stage interval 2202. In decision block 2206, a log message 2214 has a time stamp $t_2$ in the second stage interval 2202 and control flows to block 2207. In block 2207, event-type analysis is applied to the log message 2214 to determine the event type as described above with reference to FIG. 18. FIG. 23 shows an example log message 2302 with event-type analysis applied to obtain an event type 2304. Returning to FIG. 22, in block 2208, terms of the event type are compared with terms of the second rule 1910. For example, in FIG. 19, the second rule 1910 defines an ending for a startup process. In FIG. 23, underlined terms 2306 and 2308 of the event type 2304 match terms in the lists 1912 and 1914 of the second rule 1910. As a result, a match between the event type 2304 and terms of the second rule 1910 is found. Returning to FIG. 22, in decision block 2209, control flows to block 2210 in which a copy 2216 of the log message 2214 is written to the buffer 2036 in the data-storage device 2008. A single compound alert is generated indicating that the startup process defined by the two-stage process rule in FIG. 19 completed and copies of the log messages 2036 and 2216 may be displayed or sent to the system administrator as confirmation that the process completed. Otherwise, control flows to block 2211 and the operations represented by blocks 2206-2211 are repeated for a next log message in the log-message file 2016. In decision block 2206, when the end of the second stage interval 2202 is reached, time stamps of the log messages are no longer in the second stage interval 2202 and control flows to block 2212. In block 2212, an alert is generated indicating that the second rule is not satisfied.

Figure 24:
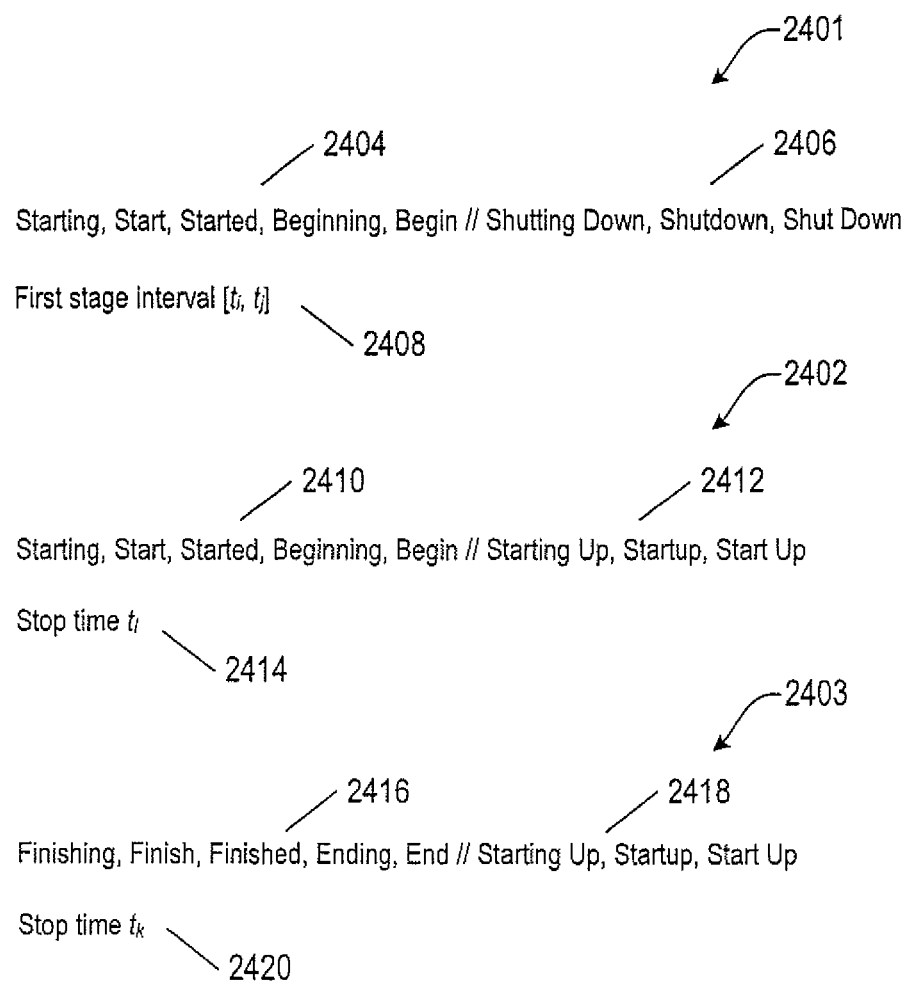
FIG. 24 shows an example of a three-stage process rule that corresponds to shutting down a process, starting up the process, and finishing starting up for the process.

FIG. 24 shows an example of a three-stage process rule composed of rules 2401-2403 that correspond to shutting down a process, starting up the process, and finishing starting up for the process. The first rule 2401 comprises two lists of terms 2404 and 2406 associated with starting a shutdown for a process and a first stage interval denoted by $[t_i, t_j]$ 2408, where $t_i$ is a begin time and $t_j$ is an end time for the first stage interval. A log message with a combination of terms from the lists 2404 and 2406 and has a time stamp in the first stage interval 2408 satisfies the first rule of the three-stage process rule. The second rule 2402 comprises two lists of terms 2410 and 2412 associated with starting up a process and a stop search time 2414 denoted by $t_l$, where the stop time $t_l$ occurs later than the end time $t_j$. A log message with any combination of terms from the lists 2410 and 2412 and has a time stamp that occurs earlier than the stop search time $t_l$ satisfies the second rule of the three-stage process rule. The third rule 2403 comprises two lists of terms 2416 and 2418 associated with finishing starting up for a process and a stop search time 2420 denoted by $t_k$, where the stop time $t_k$ occurs later than the end time $t_l$. A log message with any combination of terms from the lists 2416 and 2418 and has a time stamp that occurs earlier than the stop search time $t_k$ satisfies the third rule of the three-stage process rule.

Figure 25:
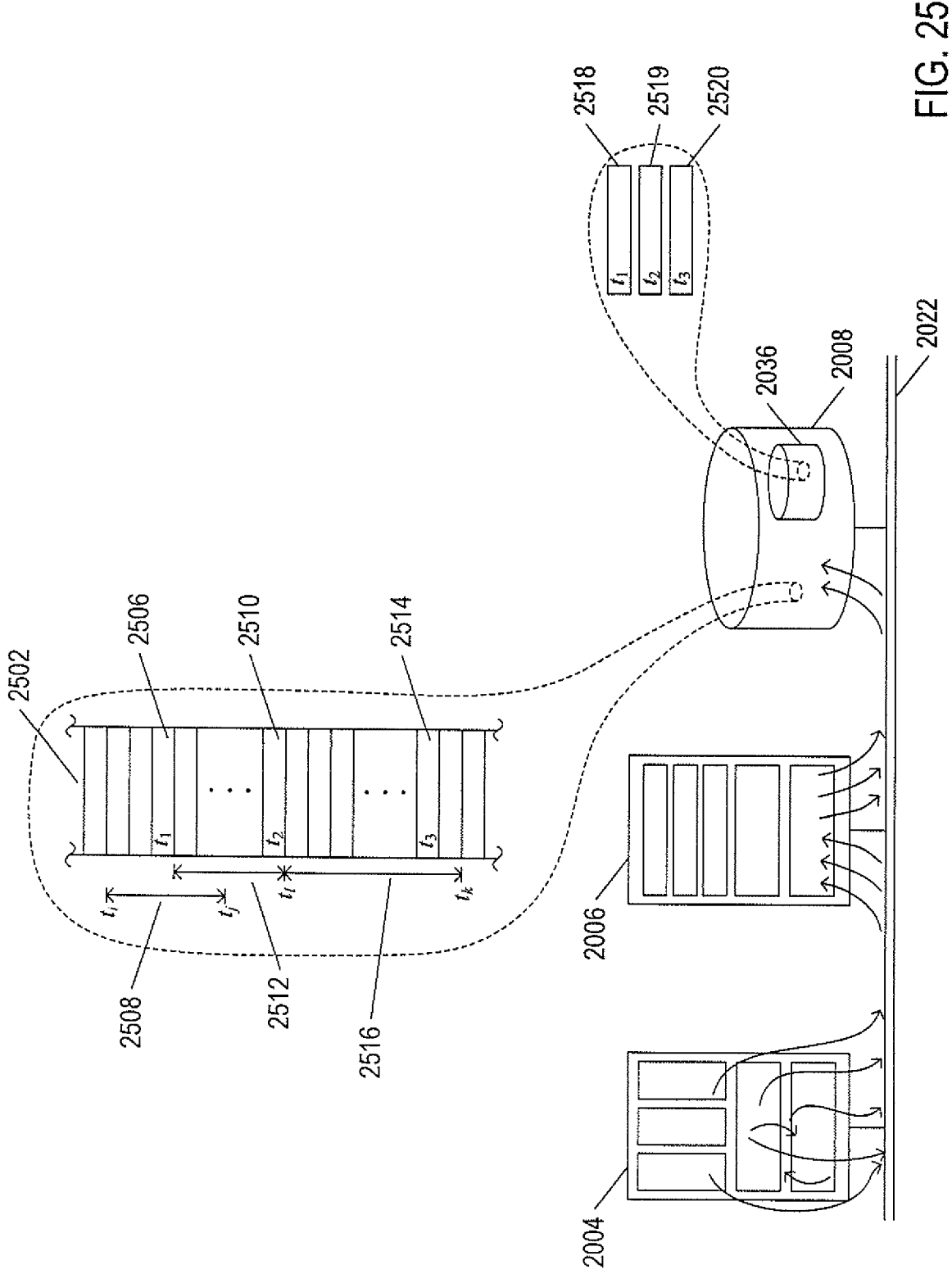
FIG. 25 shows an example search for three log messages that satisfy the three-stage process rule of FIG. 24.

FIG. 25 shows an example search for three log messages that satisfy all three rules of the three-stage process rule of FIG. 24. The log management server searches a log-message file 2502 stored in the data-storage device 2008 and corresponds to a process running in the computer system 2004 for three log messages that satisfies each rule of the three-stage process rule of FIG. 24 as described above. In the example of FIG. 25, a first log message 2506 with a time stamp $t_1$ lies within the first stage interval 2508 and satisfies the first rule. A second log message 2510 with a time stamp $t_2$ lies within a second stage interval 2512 that begins with the time stamp $t_1$ and ends with the stop time $t_l$ and satisfies the second rule. A third log message 2514 with a time stamp $t_3$ lies within a third stage interval 2516 that begins with the time stamp $t_2$ and ends with the stop time $t_k$ and satisfies the third rule. If any of the three log messages 2506, 2510, and 2514 are not generated within the corresponding intervals 2508, 2512, and 2516, an alert is generated indicating that the process has not completed. If, on the other hand, the three log messages 2506, 2510, and 2514 are generated within the corresponding intervals 2508, 2512, and 2516, copies 2518-2520 of the log messages 2506, 2510, and 2514 are stored in a buffer 2036 of the data-storage appliance 2008. A single compound alert may be generated indicating that the process completed and copies of the log messages 2506, 2510, and 2514 may be displayed or sent to the system administrator as confirmation that the process completed.

Note that in alternative implementations, the second and third stage intervals may both be extended to range from the begin time $t_i$ of the first stage interval to the respective stop times $t_l$ and $t_k$. In still other implementations, the stop time for the second stage may be the same as the stop time of the third rule.

Multistage process rules described above may be extended to search multiple log-message files generated by event sources followed by a search of the log-message files for the same number of follow-up events that are expected to occur after the preceding events. Let N be the number of original events recorded in N log messages. Let M be the number of follow-up events recorded in M log messages. When the number N equals the number M, no alert is generated. When M is less than, a compound alert is generated indicating that not all of the follow-up events completed.

Figure 26A:
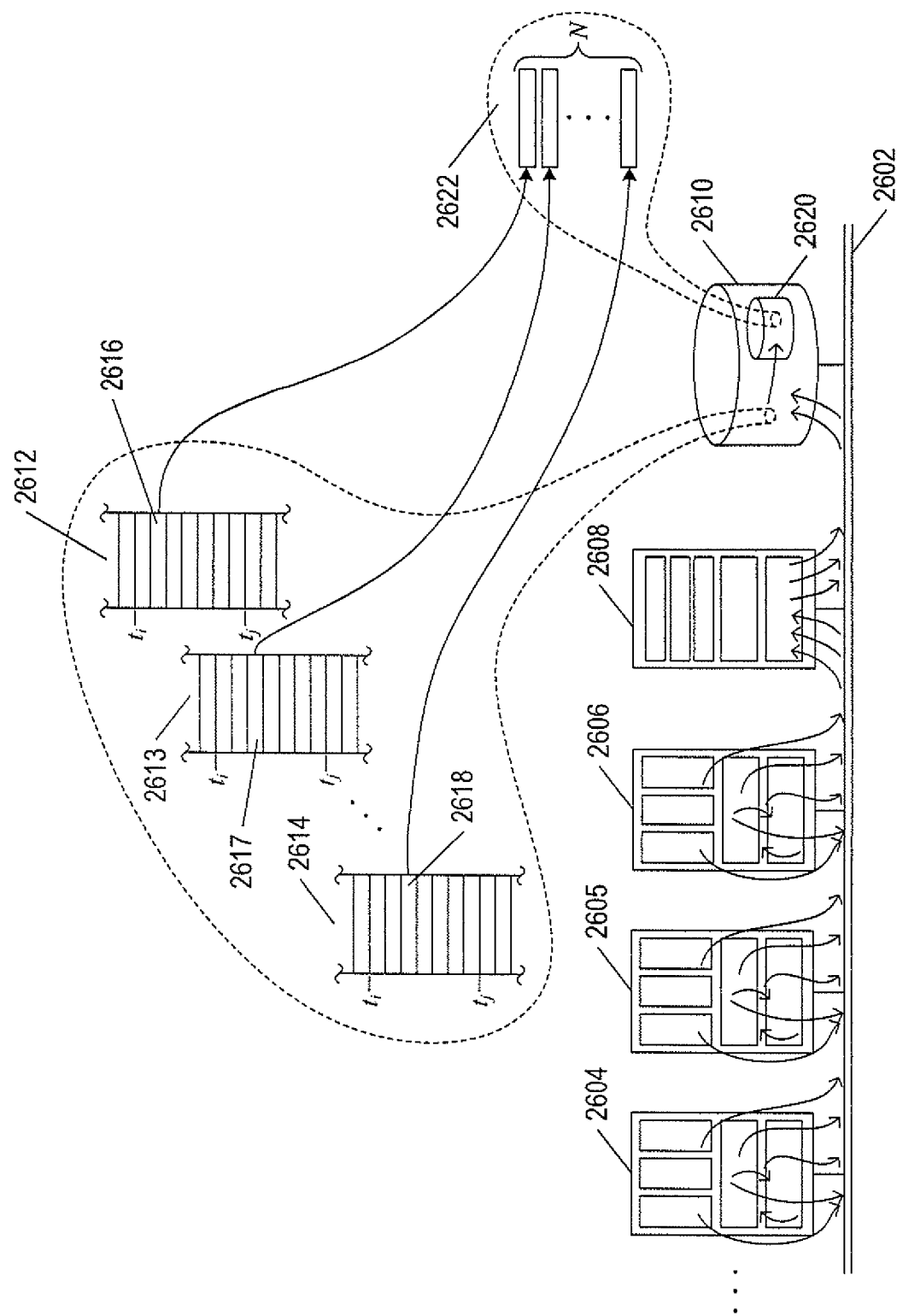
FIGS. 26A-26B show an example of a search for log messages of a two-stage process rule extended to multiple event sources of a distributed computing system.
Figure 26B:
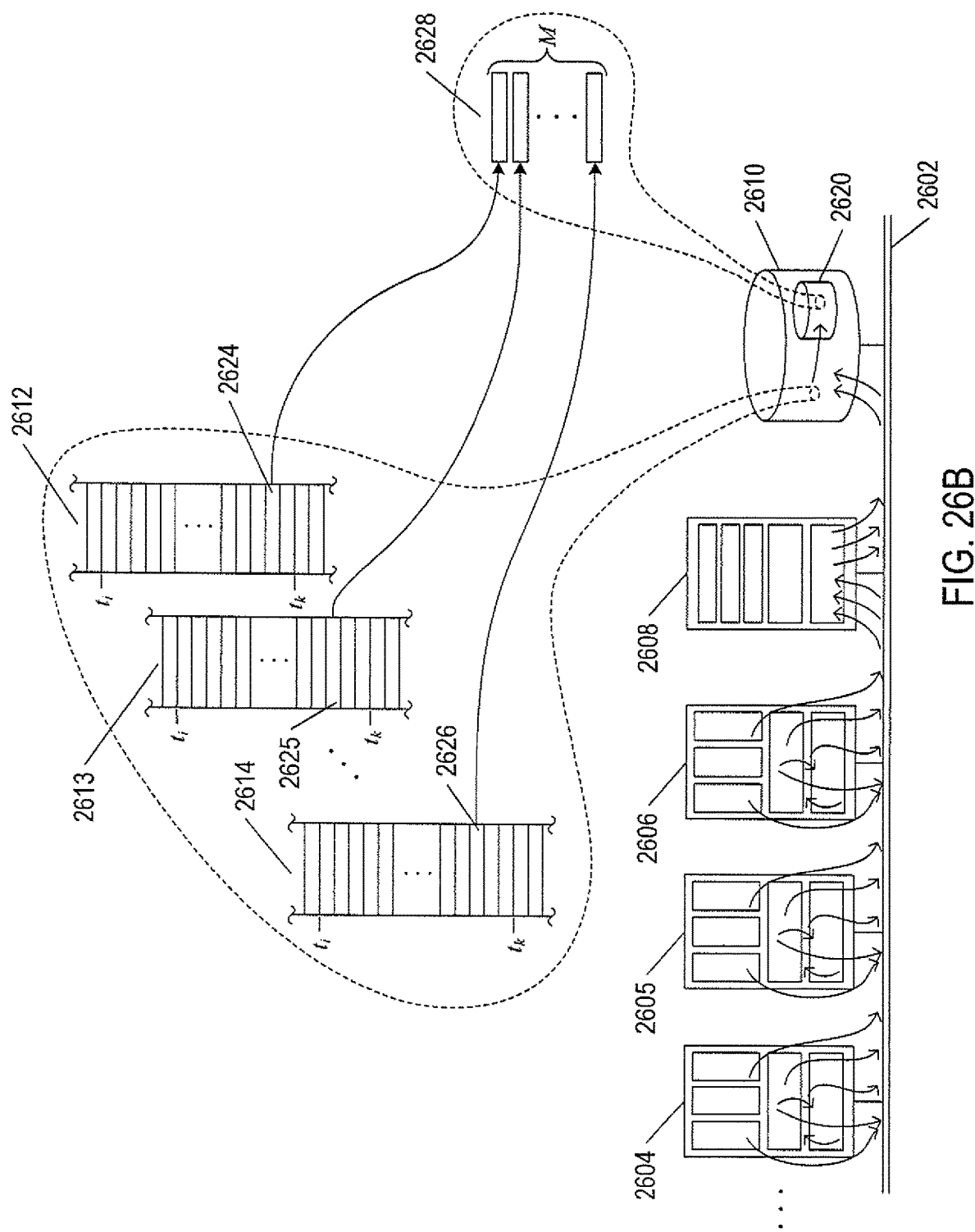

FIGS. 26A-26B show an example of a search for log messages of a two-stage process rule, such as the two-stage process rule of FIG. 19, extended to multiple event sources spread across multiple computer systems of a distributed computing system. In FIGS. 26A-26B, an electronic communications medium 2602 provides a communications link for numerous computer systems, such as computer systems 2604-2606, of a distributed computing system, an administration computer system 2608, and a data-storage appliance 2610. The computer systems run log management agents that collect log messages generated by various event sources running on the computer systems and forwards the log messages to a log management server running on the administration computer system 2608 via the communications medium 2602. The log management server running in the administration computer 2608 receives the log messages and stores the received log messages in the data-storage appliance 2610 as log-message files, as described above with reference to FIG. 13.

In the example of FIG. 26A, a positive integer, N, is a first stage counter of the number of log-message files 2612-2614 with a log message in a first stage interval and satisfies a first rule of a two-stage process rule. As described above with reference to FIG. 20, log messages 2616-2618 that satisfy the first rule of the two-stage process rule are identified, counted, and written to a buffer 2620 in the data-storage appliance 2610. In the example of FIG. 26A, N log messages 2622 have been counted and recorded in the buffer.

In the example of FIG. 26B, the log-message files 2612-2614 are each searched, as described above with reference to FIG. 22, for log messages in a second stage interval of a second rule of a two-stage process rule, where a positive integer M is a second stage counter of the number of log-message files with a log message in the second stage interval and satisfies the second rule of the two-stage process rule. In this example, the second stage interval extends from the initial time $t_i$ to a stop time $t_k$. As described above with reference to FIG. 22, log messages 2624-2626 that satisfy the second rule of the two-stage process rule are identified, counted, and written to the buffer 2620. In the example of FIG. 26B, M log messages 2628 have been counted and recorded in the buffer. When the first stage counter N equals the second stage counter M, no alert is generated. When the second stage counter M is less than the first stage counter N, a compound alert is generated indicating that not all of the follow-up events completed.

The methods described below with reference to FIGS. 27-30 are stored in one or more data-storage devices as machine-readable instructions that when executed by one or more processors of the computer system shown in FIG. 2 to compound alerts and limit false positive alerts.

Figure 27:
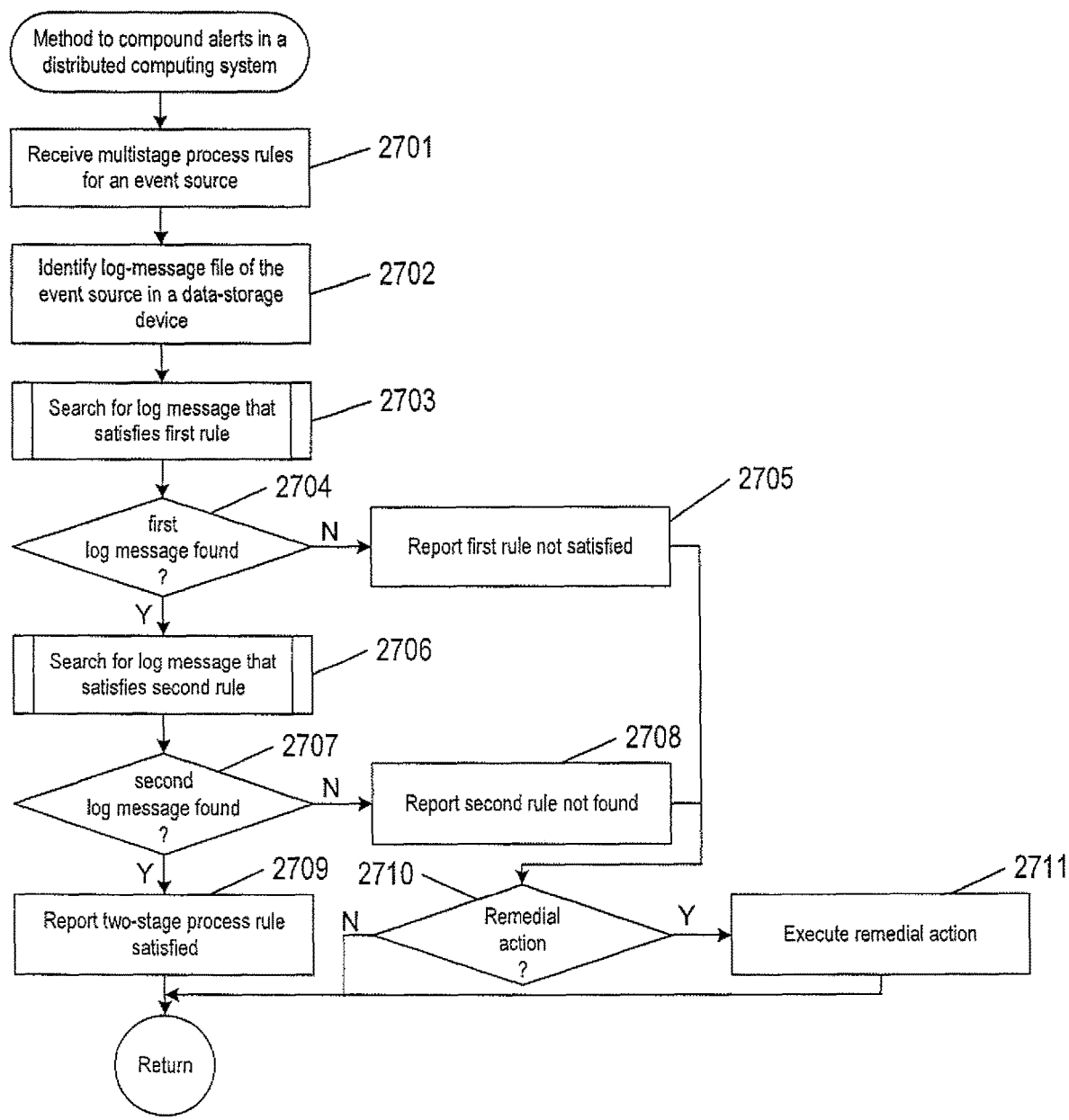
FIG. 27 shows a control flow diagram of a method to compound alerts in a distributed computing system.

FIG. 27 shows a control flow diagram of a method to compound alerts in a distributed computing system. In block 2701, multistage process rules associated with an event source are received as input. In block 2702, a log-message file stored in a data-storage device for recording log messages of the event source is identified. In block 2703, a routine "search for log message that satisfies first rule" is called. In decision block 2704, when a first log message is not found to satisfy the first rule, control flows to block 2705. Otherwise, control flows to block 2706. In block 2705, the first rule of the multistage process rule is reported as not being satisfied. For example, a system administrator may receive an email indicating that the first rule is not satisfied, or the report may be displayed in a dashboard of a graphical user interface ("GUI") the system administrator uses to monitor the distributed computing system. In block 2706, a routine "search for log message that satisfies second rule" is called. In decision block 2707, when a second log message is not found to satisfy the second rule, control flows to block 2708. Otherwise, control flows to block 2709. In block 2708, the second rule of the multistage process rule is reported as not being satisfied. For example, the system administrator may receive an email indicating that the second rule is not satisfied or the report may be displayed in the dashboard of the GUI the system administrator uses to monitor the distributed computing system. In block 2709, the multistage process is reported as completed. For example, the system administrator may receive an email indicating that the multistage process is finished or be displayed in the dashboard of the GUI the system administrator uses to monitor the distributed computing system. In decision block 2710, if remedial measures are available to correct the problem created by the process failing to complete, control flows to block 2711. In block 2711, preset instructions may be executed to remedy the problem. For example, if a process of an VM or server computer failed to finish, the instructions may be to automatically restart the server computer or migrate the VM to a different server computer.

Figure 28:
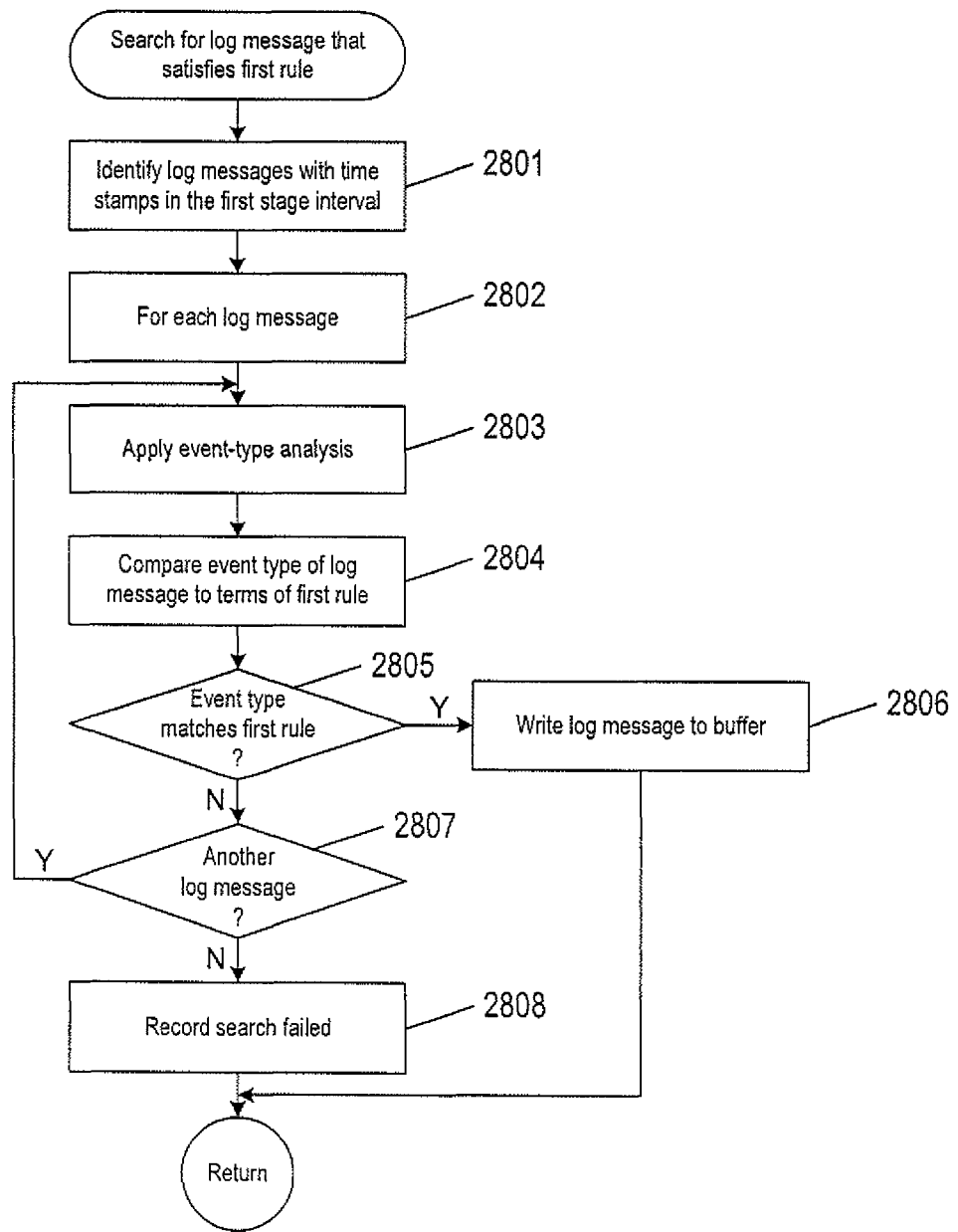
FIG. 28 shows a control flow diagram for the routine "search for log message that satisfies first rule" called in FIG. 27.

FIG. 28 shows a control flow diagram for the routine "search for log message that satisfies first rule" called in block 2703 of FIG. 27. In block 2801, log message in the log-message file with time stamps in a first stage interval of the first rule are identified. A loop beginning with block 2802 repeats the computational operations represented by blocks 2802-2807 for each log message with time stamps in the first stage interval until a log message that satisfies the first rule is identified. In block 2803, event-type analysis is applied to a log message to determine the event type of the log message as described above with reference to FIGS. 18, 20 and 21. In block 2804, the event type of log message is compared with terms of the first rule as described above with reference to FIG. 21. In decision block 2805, if the event type matches the terms of the first rule, control flows to block 2806. Otherwise, control flows to decision block 2807. In block 2806, the log message is written to a buffer in a data-storage device, as described above with reference to FIG. 20. In decision block 2807, when none of the log messages in the first stage interval matches the first rule, control flows to block 2808. In block 2808, the search failed is recorded.

Figure 29:
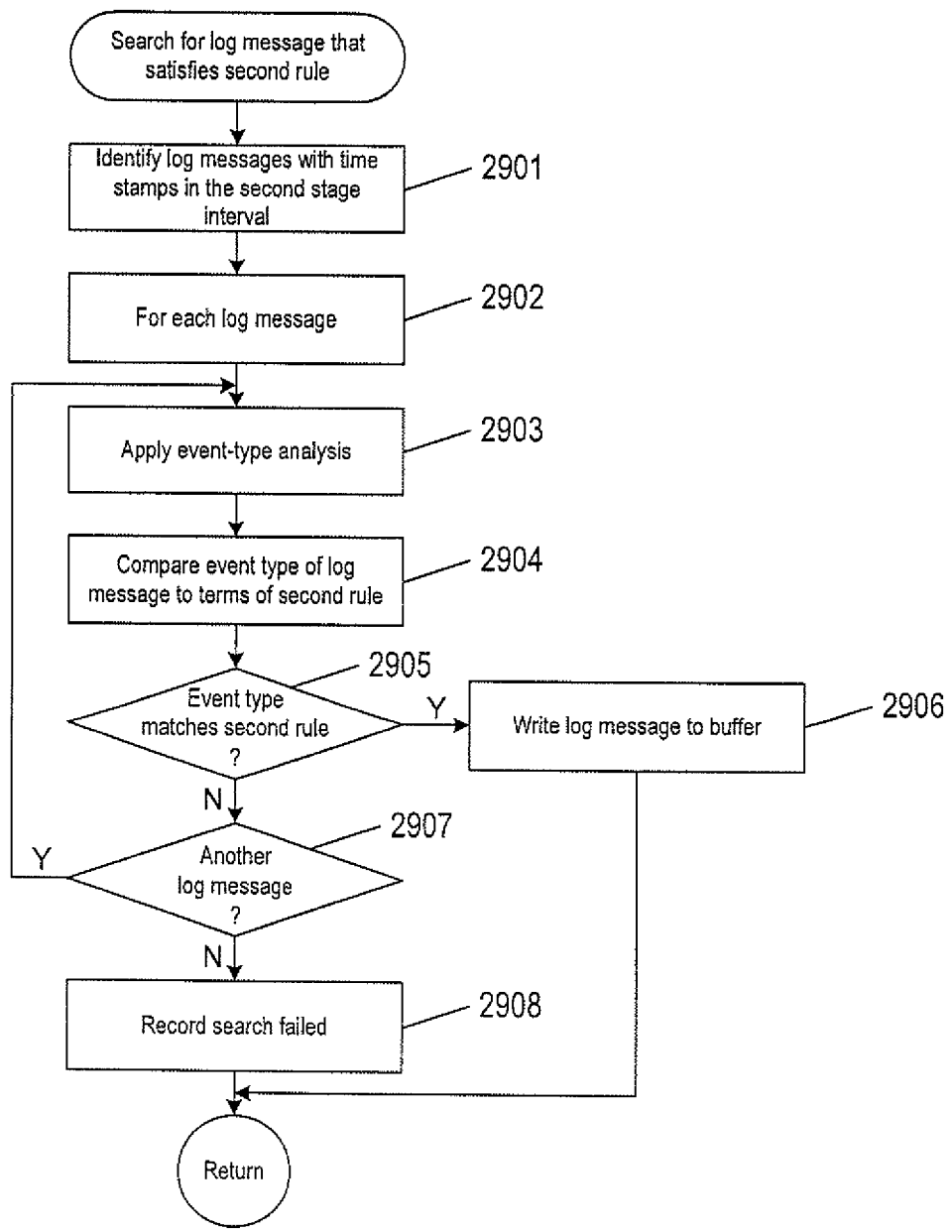
FIG. 29 shows a control flow diagram for the routine "search for log message that satisfies second rule" called in FIG. 27.

FIG. 29 shows a control flow diagram for the routine "search for log message that satisfies second rule" called in block 2707 of FIG. 27. In block 2901, log message in the log-message file with time stamps in a first stage interval of the second rule are identified. A loop beginning with block 2902 repeats the computational operations represented by blocks 2902-2907 for each log message with time stamps in the second stage interval until a log message that satisfies the second rule is identified. In block 2903, event-type analysis is applied to a log message to determine the event type of the log message as described above with reference to FIGS. 18, 22 and 23. In block 2904, the event type of log message is compared with terms of the first rule as described above with reference to FIG. 21. In decision block 2905, if the event type matches the terms of the second rule, control flows to block 2906. Otherwise, control flows to decision block 2907. In block 2906, the log message is written to a buffer in a data-storage device, as described above with reference to FIG. 20. In decision block 2907, when none of the log messages in the second stage interval matches the second rule, control flows to block 2908. In block 2908, the search failed is recorded.

Figure 30:
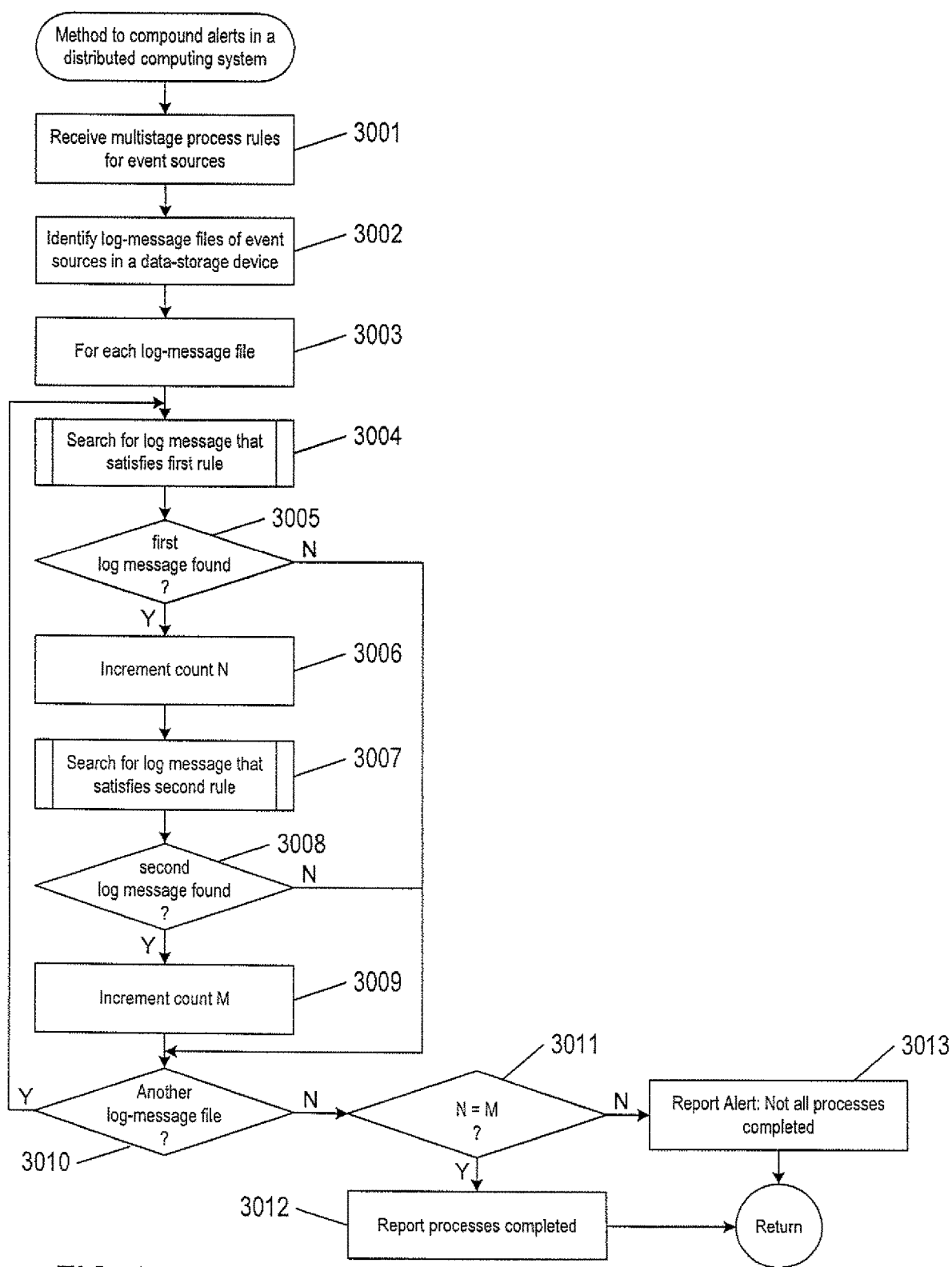
FIG. 30 shows a control flow of a method to compound alerts in a distributed computing system.

FIG. 30 shows a control flow of a method to compound alerts in a distributed computing system. In block 3001, multistage process rules associated with an event source are received as input. In block 3002, log-message files stored in a data-storage device for recording log messages of the event sources are identified. A for loop beginning in block 3003 repeats the computational operations of blocks 3004-3010 for each of the log-message files. In block 3004, a routine "search for log message that satisfies first rule" is called. In decision block 3005, when a first log message is found to satisfy the first rule, control flows to block 3006. Otherwise, control flows to block 3010. In block 3006, a first stage counter N is incremented. In block 3007, a routine "search for log message that satisfies second rule" is called.

In decision block 3008, when a second log message is found to satisfy the second rule, control flows to block 3009. Otherwise, control flows to block 3010. In block 3009, a second stage counter M is incremented. In decision block 3010, when no more log-message files are available for the event sources, control flows to decision block 3011. In decision block 3011, when the first stage counter N equals the second stage counter M, control flows to block 3012. Otherwise, control flows to block 3013. In block 3012, the processes are reported as being complete for the event sources. In block 3013, an alert is generated, and the processes are reported as incomplete. The alert may include a list of the log messages recorded in the data-storage device as described above with reference to FIG. 20. Methods include executing remedial action, such as computer instructions, to correct the problem.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to compound alerts of a multistage process executed in a distributed computing system, the process comprising:
   searching a log-message database stored in a data-storage device to identify a log-message file generated by event sources of the multistage process;
   identifying log messages of the log-message file that satisfy rules of a set of multistage process rules defined for the multistage process; and
   generating a compound alert indicating that the set of multistage process rules are satisfied, when log messages of the log-message file that satisfy the rules of the set of multistage process rules have been identified.

2. The process of claim 1 further comprising executing remedial action to correct the multistage process when log messages of the log-message file fail to satisfy at least one rule of the set of multistage process rules.

3. The process of claim 1 wherein identifying log messages of the log-message file that satisfy rules of the set of multistage process rules defined for the multistage process comprises:
   for each rule, identifying log messages with time stamps in a time interval associated with the rule; and
   to each log message in the time interval,
       applying event-type analysis to determine an event type of the log message,
       comparing terms of the event type to terms of the rule, and
       writing the log message to a buffer when the event type matches the rule.

4. The process of claim 3 further comprising when no log messages in the time interval satisfies the rule, generating an alert that indicates no log message satisfies the rule.

5. A system to compound alerts of a multistage process executed in a distributed computing system, the system comprising:
   one or more processors;
   one or more data-storage devices; and
   machine-readable instructions stored in the one or more data-storage devices that when executed using the one or more processors controls the system to perform operations comprising:
       searching a log-message database stored in a data-storage device to identify log-message files generated by event sources of the multistage process;
       for each log-message file,
           searching the log-message file for a first log message that satisfies a first rule of multistage process rules that confirms completion of a first stage of the multistage process,
           when a first log message that satisfies the first rule is identified, incrementing a first stage counter,
           searching the log-message file for a second log message that satisfies a second rule of the multistage process rules that confirms completion of a second stage of the multistage process, and
           when a second log message that satisfies the second rule is identified, incrementing a second stage counter; and
       when the second stage counter is less than the first stage counter, generating a compound alert indicating that not all stages of the multistage process completed successfully.

6. The system of claim 5 further comprising executing remedial action to correct the process, when no log message of the log-message file satisfies the second rule.

7. The system of claim 5 wherein searching the log-message file for the first log message that satisfies the first rule of multistage process rules comprises:
   identifying log messages with time stamps in a first stage interval of the first rule; and
   to each log message in the first stage interval,
       applying event-type analysis to determine an event type of the log messages,
       comparing terms of the event type to terms of the first rule, and
       writing the log message to a buffer when the event type matches the first rule, when terms of the event type match terms of the first rule.

8. The system of claim 5 wherein searching the log-message file for the second log message that satisfies the second rule of multistage process rules comprises:
   identifying log messages with time stamps in a second stage interval of the second rule; and
   to each log message in the second stage interval,
       applying event-type analysis to determine an event type of the log messages,
       comparing terms of the event type to terms of the second rule, and
       writing the log message to a buffer when the event type matches the second rule, when terms of the event type match terms of the second rule.

9. A non-transitory computer-readable medium encoded with machine-readable instructions that implement a method carried out by one or more processors of a computer system to perform operations comprising:
   searching a log-message database stored in a data-storage device to identify a log-message file of an event source that runs in a computer system of a distributed computing system;
   searching the log-message file for a first log message that satisfies a first rule of multistage process rules that confirms completion of a first stage of a multistage process;

when a first log message that satisfies the first rule is identified, searching the log-message file for a second log message that satisfies a second rule of the multistage process rules that confirms completion of a second stage of the multistage process; and generating a compound alert indicating that the process completed successfully when a log message of the log-message file satisfies the second rule.

10. The medium of claim 9 further comprising executing remedial action to correct the process, when no log message of the log-message file satisfies the second rule.

11. The medium of claim 9 wherein searching the log-message file for the first log message that satisfies the first rule of multistage process rules comprises:

identifying log messages with time stamps in a first stage interval of the first rule; and to each log message in the first stage interval,
applying event-type analysis to determine an event type of the log messages,
comparing terms of the event type to terms of the first rule, and
writing the log message to a buffer when the event type matches the first rule, when terms of the event type match terms of the first rule.

12. The medium of claim 11 further comprising generating an alert that indicates no log message is in the first stage interval, when no log message of the log-message file satisfies the first rule.

13. The medium of claim 9 wherein searching the log-message file for the second log message that satisfies the second rule of multistage process rules comprises:

identifying log messages with time stamps in a second stage interval of the second rule; and to each log message in the second stage interval,
applying event-type analysis to determine an event type of the log messages,
comparing terms of the event type to terms of the second rule, and
writing the log message to a buffer when the event type matches the second rule, when terms of the event type match terms of the second rule.

14. The medium of claim 13 further comprising generating an alert that indicates no log message is in the second stage interval, when no log message of the log-message file satisfies the second rule.

\* \* \* \* \*